(12) United States Patent
Onoguchi

(10) Patent No.: US 7,901,198 B2
(45) Date of Patent: Mar. 8, 2011

(54) SHAPE-FORMING SHUTTER APPARATUS AND SHUTTER PIECE THEREOF

(75) Inventor: Kazuyoshi Onoguchi, Nikko (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 285 days.

(21) Appl. No.: 12/097,812

(22) PCT Filed: Dec. 19, 2006

(86) PCT No.: PCT/JP2006/325283

§ 371 (c)(1),
(2), (4) Date: Jun. 17, 2008

(87) PCT Pub. No.: WO2007/072823

PCT Pub. Date: Jun. 28, 2007

(65) Prior Publication Data

US 2009/0232924 A1    Sep. 17, 2009

(30) Foreign Application Priority Data

Dec. 21, 2005  (JP) .............................. 2005-368816
Oct. 5, 2006   (JP) .............................. 2006-274161

(51) Int. Cl.
*A21C 11/10* (2006.01)
(52) U.S. Cl. .................. 425/289; 425/306; 425/307; 425/330
(58) Field of Classification Search ............... 425/289, 425/330, 306, 307
See application file for complete search history.

(56) References Cited

U.S. PATENT DOCUMENTS 2,821,006 A * 1/1958 Pfannmueller et al. ...... 264/635

(Continued)

FOREIGN PATENT DOCUMENTS

EP    0476392 A1 * 3/1992

(Continued)

OTHER PUBLICATIONS

English language Abstract of JP 10-084877, Apr. 7, 2008.

(Continued)

*Primary Examiner*—Yogendra N Gupta
*Assistant Examiner*—Emmanuel S Luk
(74) *Attorney, Agent, or Firm*—Greenblum & Bernstein P.L.C.

(57) ABSTRACT

Disclosed is an shape-forming shutter apparatus including a plurality of shutter pieces, each having an shaping surface and a sliding surface, which are arranged in a circle with the shaping surface of each shutter piece being slidably in sliding contact with the sliding surface of the neighboring separate shutter piece, and the shape-forming shutter apparatus being capable of dilating and contracting an opening part surrounded by the shaping surfaces respectively of the plurality of shutter pieces. The shape-forming shutter apparatus includes pressure contact biasing means for always keeping the shaping surface of each shutter piece and the sliding surface of the neighboring shutter piece slidably in pressure contact with each other. The pressure contact biasing means is a ring-shaped elastic member for biasing the shutter pieces equally in such a direction to close the opening part. The elastic member is stretchingly wound around the shutter pieces in an end of each shutter piece, which end is separate away from the other end thereof where the shaping surface of the shutter piece and the sliding surface of the neighboring shutter piece intersect each other.

9 Claims, 14 Drawing Sheets

U.S. PATENT DOCUMENTS

| | | | |
|---|---|---|---|
| 3,524,218 A * | 8/1970 | Butcher | 425/529 |
| 3,903,598 A * | 9/1975 | Lefebvre | 30/112 |
| 4,187,068 A * | 2/1980 | Vassar | 425/381 |
| 4,210,196 A * | 7/1980 | Weiner | 164/152 |
| 5,031,520 A * | 7/1991 | Tsay | 99/353 |
| 5,153,010 A * | 10/1992 | Tashiro et al. | 425/287 |
| 5,223,277 A * | 6/1993 | Watanabe et al. | 425/132 |
| 5,518,391 A | 5/1996 | Tashiro | |
| 5,974,668 A * | 11/1999 | Butzer | 30/112 |
| 6,174,154 B1 * | 1/2001 | Tashiro | 425/132 |
| 6,248,385 B1 * | 6/2001 | Tashiro | 426/503 |
| 6,892,630 B1 * | 5/2005 | Huang | 99/450.1 |

FOREIGN PATENT DOCUMENTS

| | | | |
|---|---|---|---|
| EP | 0832562 A2 * | 4/1998 | |
| JP | 4-52738 | | 8/1992 |
| JP | 408080154 A * | 3/1996 | |
| JP | 2729898 | | 12/1997 |
| JP | 410202701 A * | 8/1998 | |
| JP | 3009140 | | 12/1999 |
| JP | 3015000 | | 12/1999 |
| JP | 3078756 | | 6/2000 |
| JP | 2001-037407 | | 2/2001 |
| JP | 02001037407 A * | 2/2001 | |
| JP | 3421658 | | 4/2003 |
| JP | 2004-201504 | | 7/2004 |

OTHER PUBLICATIONS

English language Abstract of JP 2004-201504, Jul. 22, 2004.
English language Abstract of JP 2001-037407, Mar. 13, 2001.
English language Abstract of JP 2002-306149, Oct. 22, 2002.

* cited by examiner (a)

(b)

(a)

(b)

(a)

(b)

(a)

(b)

(a)

(b)

SHAPE-FORMING SHUTTER APPARATUS AND SHUTTER PIECE THEREOF

TECHNICAL FIELD

The present invention relates to a shape-forming shutter apparatus for shaping food products such as round rice cakes, buns each with a bean-jam filling and sweet buns, as well as to a shutter piece thereof. Specifically, the present invention relates to a food shape-forming shutter apparatus and a shutter piece thereof, which are used for a cutting apparatus for dividing a continuously-fed bar-shaped food dough into the above food products, as well as for a sealing apparatus for wrapping a filling with a sheet crust (a piece of food dough).

BACKGROUND ART

There have been various types of apparatus for cutting and shaping food products as apparatuses for cutting a bar-shaped food dough, for example. The apparatus for cutting and shaping food products repeatedly opens and closes a cutting opening part in a center portion surrounded by shutters multiple times while feeding a bar-shaped food dough in a dual structure including a filling and a crust to the cutting opening part in the downward direction, and thereby to cut and shape the food dough multiple times. As an example, there is a cutting/shaping apparatus provided with at least three shutter pieces: each includes a cutting surface and a sliding surface which are adjacent shaping surfaces; and the sliding surface of each shutter piece is configured to slide on the cutting surface of its neighboring (separate) shutter piece. This cutting/shaping apparatus includes: a slide holding member (connecting member) for maintaining the sliding condition of the sliding surface of each shutter piece on the cutting surface of its neighboring shutter piece; and an ascending/descending member having an entering port which the food dough can enter in the downward direction. This ascending/descending member is provided to be movable up and down and to include three or more (equal to the number of shutter pieces) vertical shafts at equal intervals on a predetermined circle on the ascending/descending member. When each vertical shaft is rotated about its axis, a corresponding swingable member is configured to swing about the axis in the horizontal direction. Furthermore, each of the shutter pieces corresponding to the connecting members is configured to be supported movably in the longitudinal direction of the corresponding swingable member. This cutting/shaping apparatus further includes a rotational operation device for synchronously rotating the vertical shafts about their own axes for the purpose of synchronously swinging the shutter pieces in the horizontal direction so as to open and close the cutting opening part. (See, for example, Japanese Patent No. 3009140: Patent Document 1.)

In addition, cutting apparatuses for shaping a semi-open wrapped food product include a type of semi-open cutting/shaping apparatus having an edge part in each of the cutting surfaces, and the crust is thus cut with the edge parts before closing the cutting opening part. (See Japanese Patent No. 301500, for example, which will be hereinafter referred to as "Patent Document 2.")

Furthermore, cutting/shaping apparatuses for forming twisted frills on the top of a wrapped food product include a type of frilled cutting/shaping apparatus having a shaping plate on the lower surface of each of the shutter pieces, and the shaping plates form an almost radiation pattern when the cutting opening part comes to a closing position. This cutting/shaping apparatus includes connecting members as the slide holding members. Each connecting member is locked to a corresponding shutter piece by use of an eccentric pin in which a portion pivotally supported by an eccentric pin fitting hole provided to the shutter piece is eccentric to a portion locked to the connecting member. (See, for example, Japanese Patent Application, Laid-Open No. 2001-037407: Patent Document 3.)

Moreover, sealing apparatuses for wrapping a filling with a sheet crust (a piece of food dough) by sealing a peripheral portion of the sheet crust include a type of apparatus using one of the shutter apparatuses shown in Patent Documents 1 to 3. (See, for example, FIG. 26 in Japanese Patent No. 3421658: Patent Document 4.)

In the cases of the apparatuses shown in Patent Documents 1, 2 and 4, each shutter piece is provided with a slide holding member for holding the slide of neighboring shutter pieces. However, these apparatuses have a problem that they are incapable of shaping food dough into a stable form when the abrasion or the like between neighboring shutter pieces forms a gap between the neighboring shutter pieces to allow a part of the food dough to go into the gap.

The apparatus shown in Patent Document 3 includes the connecting members each for setting the gap between each two neighboring shutter pieces at an optimal value which allow no part of food dough to go into the gap. However, this apparatus has a problem that the handling of the apparatus is troublesome, because the fitting position of the eccentric pin to which the connecting member is locked needs to be adjusted, in a case where an abrasion between the two neighboring shutter pieces or the like forms a gap inadequately.

The present invention has been made for the purpose of solving the foregoing problems. An object of the present invention is to provide a food shape-forming shutter apparatus which requires no gap to be adjusted between each two neighboring sliding shutter pieces, and which is easier to handle than any conventional type of food shape-forming shutter apparatus.

DISCLOSURE OF THE INVENTION

The present invention has been made with the above-described existing problems. The present invention is a shape-forming shutter apparatus including a plurality of shutter pieces, each having an shaping surface and a sliding surface, which are arranged in a circle with the shaping surface of each shutter piece being slidably in sliding contact with the sliding surface of the neighboring separate shutter piece, the shape-forming shutter apparatus being capable of dilating and contracting an opening part surrounded by the shaping surfaces of the plurality of shutter pieces. The shape-forming shutter apparatus is characterized by including pressure contact biasing means for always keeping the shaping surface of each shutter piece and the sliding surface of the neighboring shutter piece slidably in pressure contact with each other.

In addition, the present invention is a shape-forming shutter apparatus, in which shutter pieces each including an shaping surface on its side are integrally rotatably attached to a plurality of rotational shafts rotatably provided at equal intervals in a single circle, in which a front end portion of each shutter piece is slidably in contact with the shaping surface of the neighboring shutter piece, and which is capable of dilating and contracting an opening part surrounded by the shaping surfaces of the respective shutter pieces. The shape-forming shutter apparatus is characterized by including pressure contact biasing means for biasing the front end portion of each shutter piece into pressure contact with the shaping surface of the neighboring separate shutter piece in order that the frond end portion of each shutter piece and the shaping surface of the neighboring shutter piece can be kept slidably in pressure contact with each other, each shutter piece being able to move in a direction in which the front end portion of each shutter piece is pressed to the shaping surface of the neighboring separate shutter piece.

Furthermore, the present invention is any one of the shape-forming shutter apparatuses, which is characterized in that the pressure contact biasing means is a ring-shaped elastic member for biasing the shutter pieces equally, and in that the pressure contact biasing means is stretched around the shutter pieces.

Moreover, the present invention is the foregoing shape-forming shutter apparatus, which is characterized in that the elastic member is stretched around the shutter pieces at their ends each being separate away from the other end thereof where the shaping surface of the shutter piece and the sliding surface of the neighboring shutter piece intersect each other.

Additionally, the present invention is the foregoing shape-forming shutter apparatus, which is characterized in that the pressure contact biasing means is installed by stretching the pressure contact biasing means around locking parts each provided in an end of the corresponding shutter piece, which end is separate away from the other end thereof where the shaping surface of the shutter piece and the sliding surface of the neighboring shutter piece intersect each other.

In addition, the present invention is the foregoing shape-forming shutter apparatus, which is characterized in that each shutter piece is supported by a corresponding one of rotational shafts arranged at equal intervals on a single circle to be rotatable integrally with the rotational shaft, and to be movable in a direction orthogonal to an axis of the rotational shaft. The foregoing shape-forming shutter apparatus is also characterized in that the pressure contact biasing means is arranged between each rotational shaft and a locking part provided to the corresponding shutter piece.

Furthermore, the present invention is a shutter piece which includes a shaping surface and a sliding surface, and which is used for a shutter apparatus including multiple shutter pieces arranged in a circle with the shaping surface of each shutter piece being slidably in sliding contact with the sliding surface of the neighboring separate shutter piece, the shutter apparatus being capable of dilating and contracting an opening part surrounded by the shaping surfaces respectively of the multiple shutter pieces. The shutter piece is characterized by including a locking parts for stretching pressure contact biasing means therearound, the pressure contact biasing means being that for keeping the shaping surface of each shutter piece and the sliding surface of the neighboring shutter piece slidably in pressure contact with each other, and the locking parts each being provided in an end of the corresponding shutter piece, which end is separate away from the other end thereof where the shaping surface of the shutter piece and the sliding surface of the neighboring shutter piece intersect each other.

Moreover, the present invention is the foregoing shutter piece which is characterized by including an oblong hole part slidably only engaging with a sliding part provided to a rotational shaft for supporting the shutter piece.

Additionally, the present invention is a shutter piece including a shaping surface throughout its side, and used for a shutter apparatus in which shutter pieces are integrally rotatably attached respectively to multiple rotational shafts rotatably provided at equal intervals in a single circle with a front end portion of each shutter piece being slidably in sliding contact with the shaping surface of the neighboring shutter piece, and the shutter apparatus being capable of dilating and contracting an opening part surrounded by the shaping surfaces of the respective shutter pieces. The shutter piece is characterized by including: an oblong hole allowing each shutter piece to move in a direction orthogonal to an axis of the corresponding one of the rotational shafts, the oblong hole provided in an engagement part of the shutter piece, which part engages with the rotational shaft; and a locking part, pressure contact biasing means being stretched around locking parts, the pressure contact biasing means being for pressing and biasing an end portion of each shutter piece to the shaping surface of the neighboring shutter piece in order that the end portion comes into contact with the shaping surface by pressure.

The present invention causes the shaping surface of each shutter piece and the sliding surface of the neighboring shutter piece to be always kept slidably in pressure contact with each other in the shutter apparatus. As a result, the present invention makes it possible to prevent a fine gap from occurring between the shaping surface and the sliding surface, and accordingly to solve the above-described existing problems.

BEST MODES FOR CARRYING OUT THE INVENTION

Figure 1:
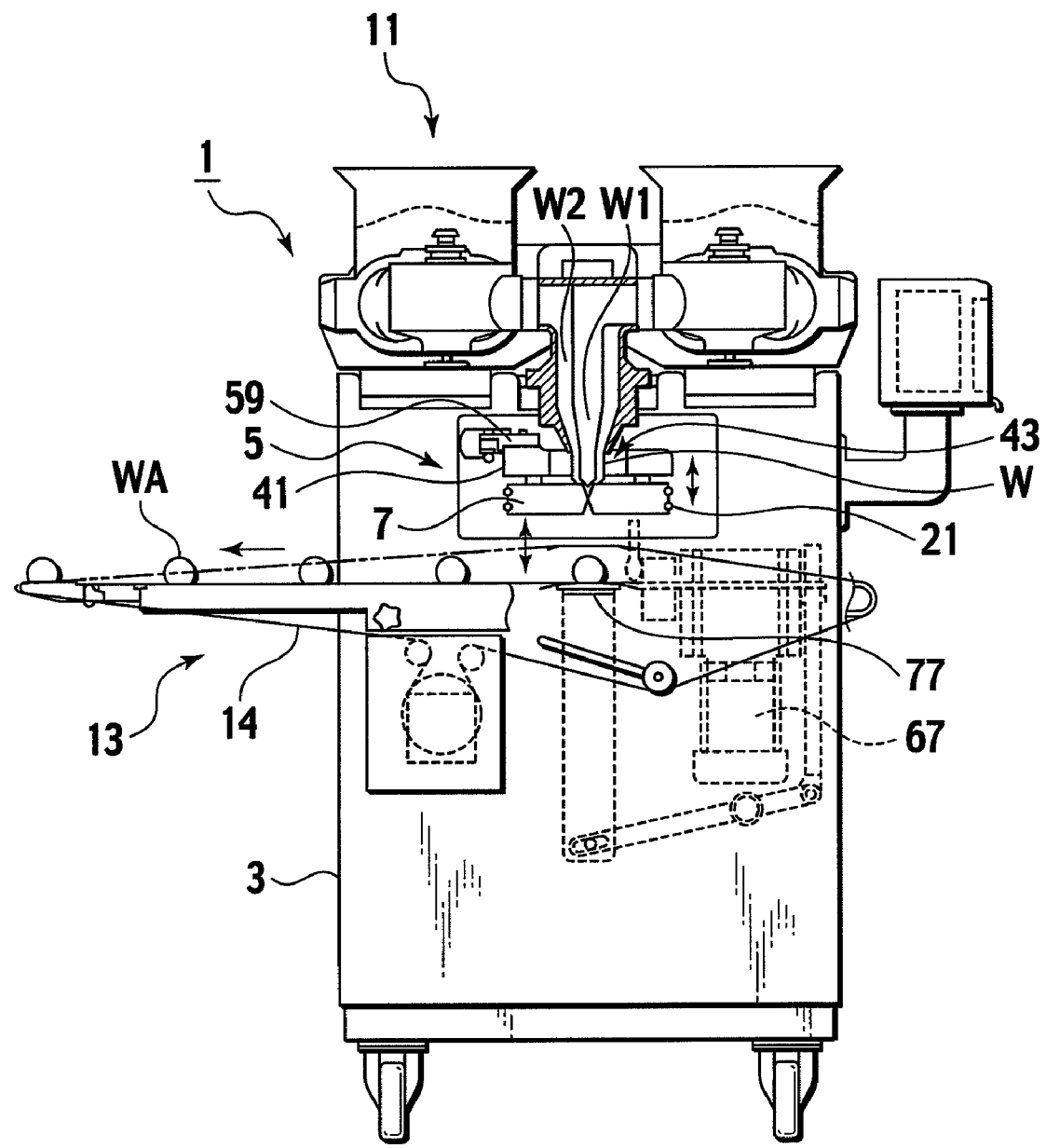
FIG. 1 is an explanatory front view showing an outline of a food producing machine including a shutter apparatus according to a first embodiment of the present invention.
Figure 2:
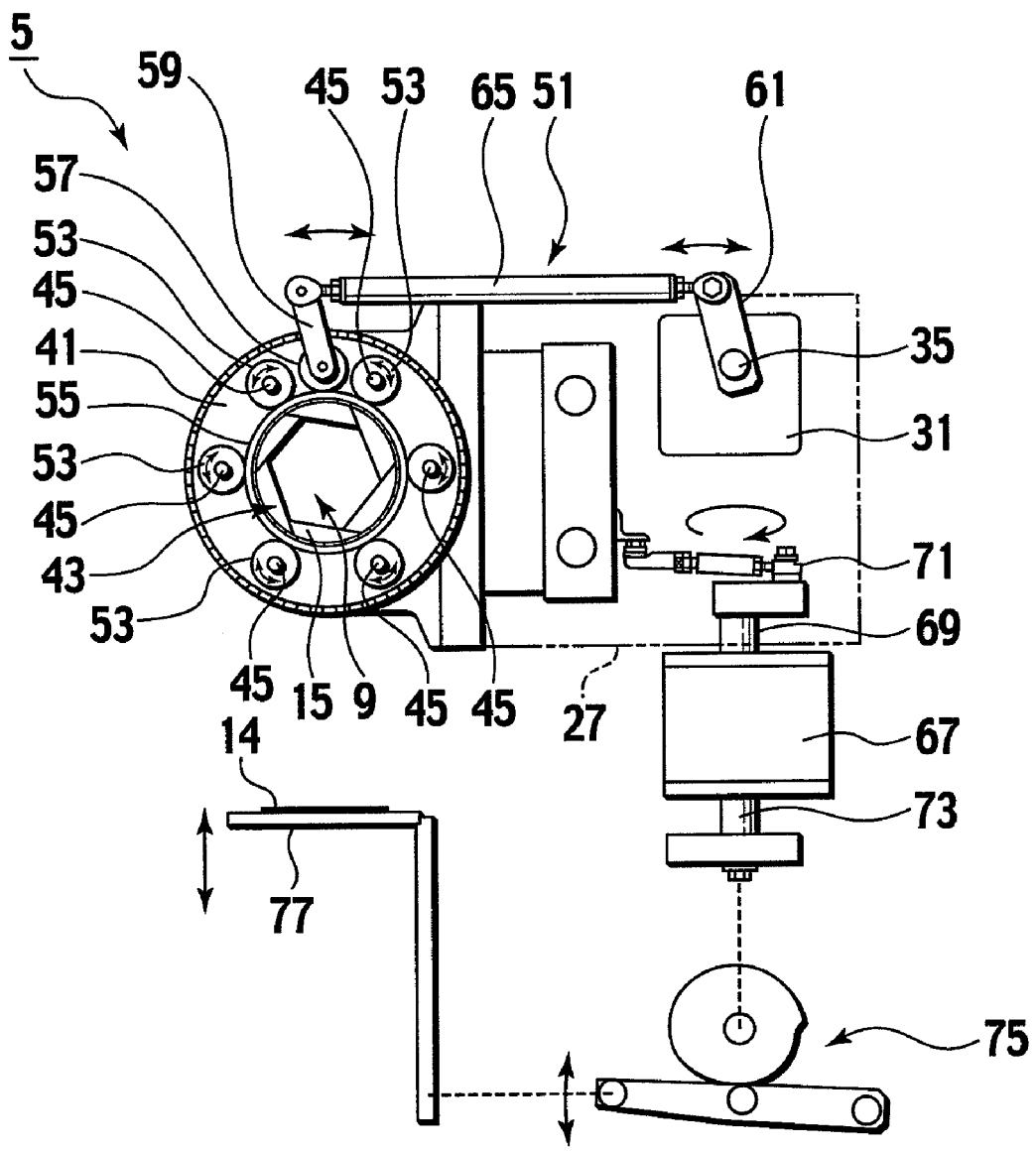
FIG. 2 is an explanatory plan view showing a schematic of a cutting/shaping apparatus.
Figure 7:
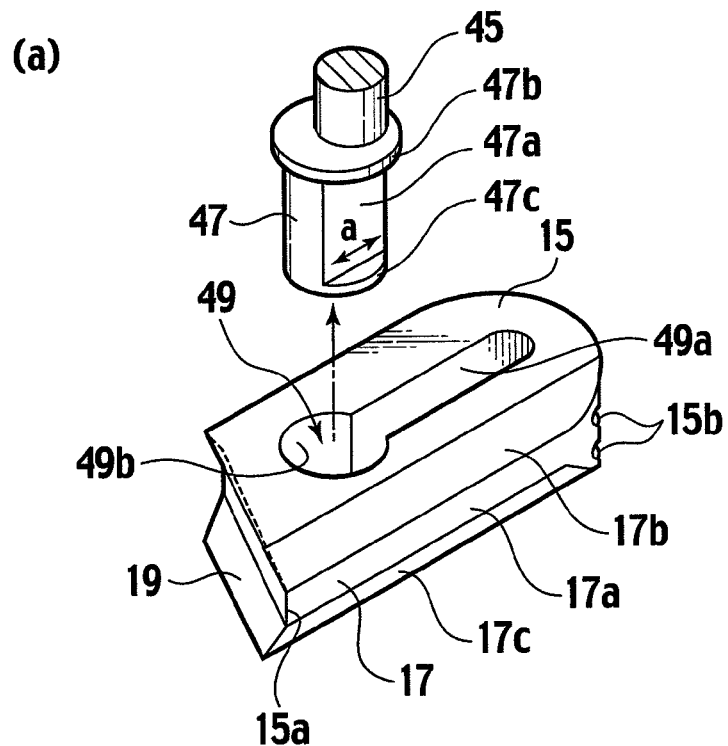
FIGS. 7(a) and 7(b) are explanatory perspective views of schematics respectively of a shutter piece and swingable member.
Figure 7:
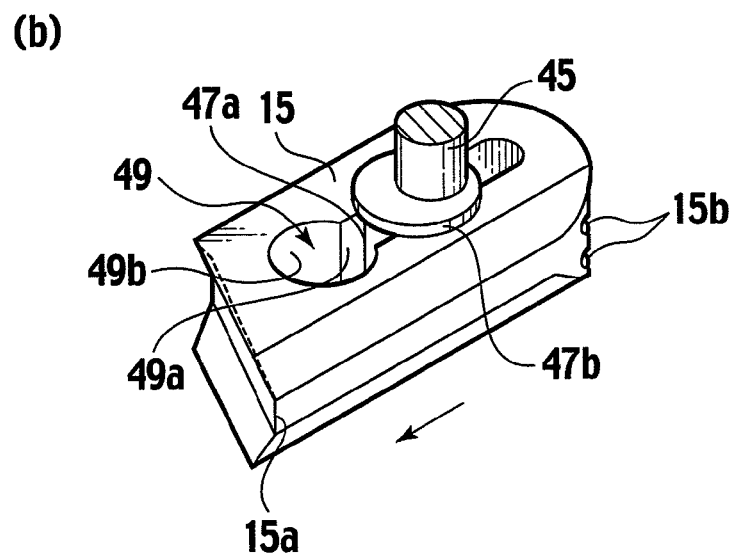

Descriptions will be provided for a food producing machine 1 including a shutter apparatus according to a first embodiment of the present invention by use of the drawings. FIG. 1 is an explanatory plan view showing a schematic of the food producing machine 1. FIG. 2 is an explanatory plan view showing a schematic of a cutting/shaping apparatus 5. FIGS. 3 to 6 are explanatory auxiliary plan views each showing how a shutter assembly 7 operates. FIG. 7 is an explanatory perspective view showing schematics respectively of a shutter piece 15 and a swingable member 47.

The food producing machine 1 cuts and shapes multiple times a two-layered bar-shaped food dough W including a filling W1 and a crust W2, and concurrently conveys food products WA in a conveyance direction (in a leftward direction in FIG. 1). Its base is a box-shaped main body frame 3. An example of the shutter apparatus, the cutting/shaping apparatus 5 is provided in the center portion of the main body frame 3. This cutting/shaping apparatus 5 is designed to repeatedly open and close a center opening 9 (see FIG. 2) as an opening part of a shutter assembly 7 multiple times while supplying a bar-shaped food dough W to the center opening 9 from above, and thereby to cut and shape the bar-shaped food dough W. A food dough feeding apparatus 11 for feeding the food dough W to the center opening 9 is provided above the cutting/shaping apparatus in the main body frame 3 (or in an upper section in FIG. 1). A conveyer 13 for conveying the food products WA in the conveyance direction is provided under the cutting/shaping apparatus 5 in the main body frame 3.

Figure 3:
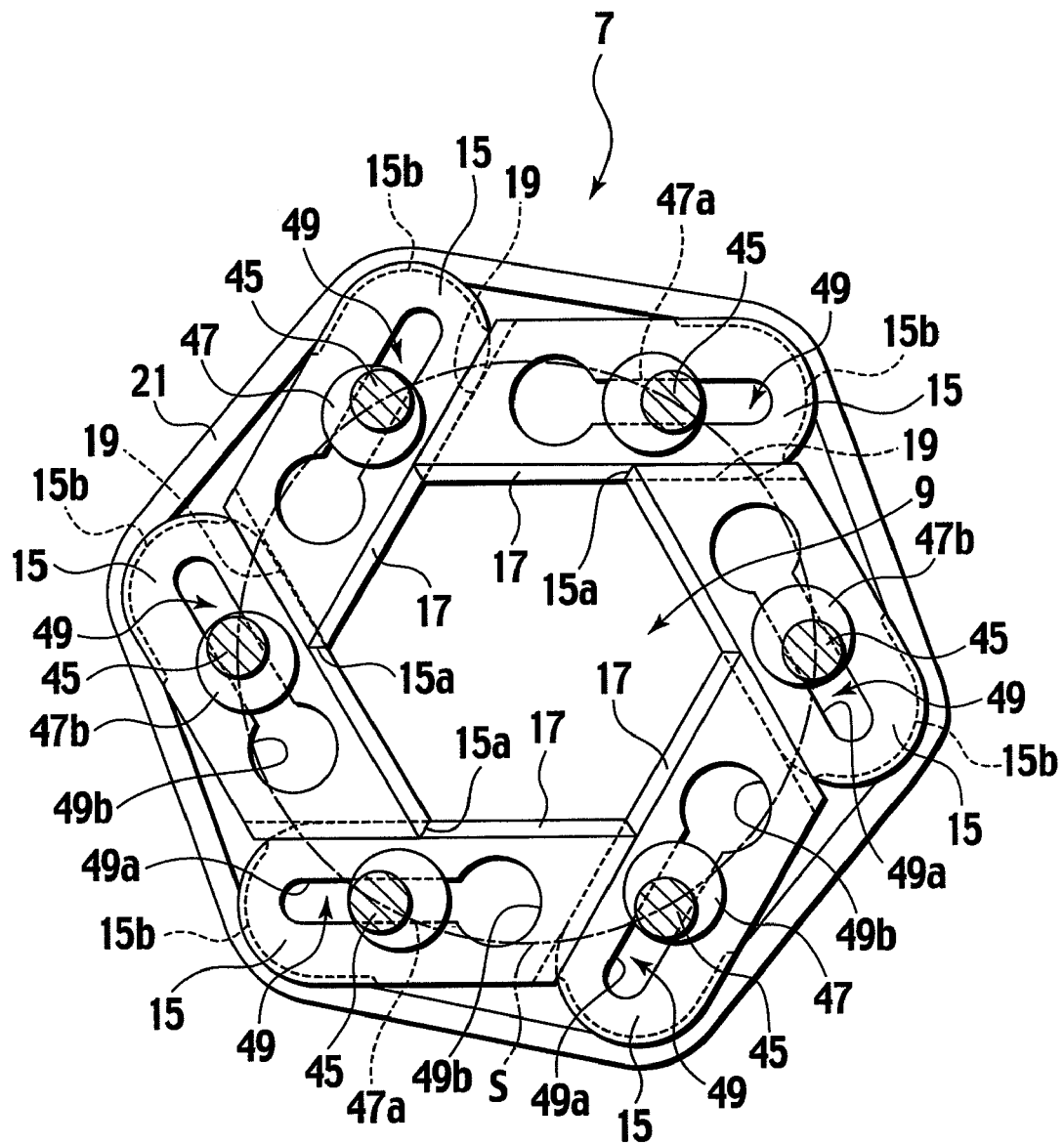
FIG. 3 is an explanatory auxiliary plan view showing how a shutter assembly operates.
Figure 4:
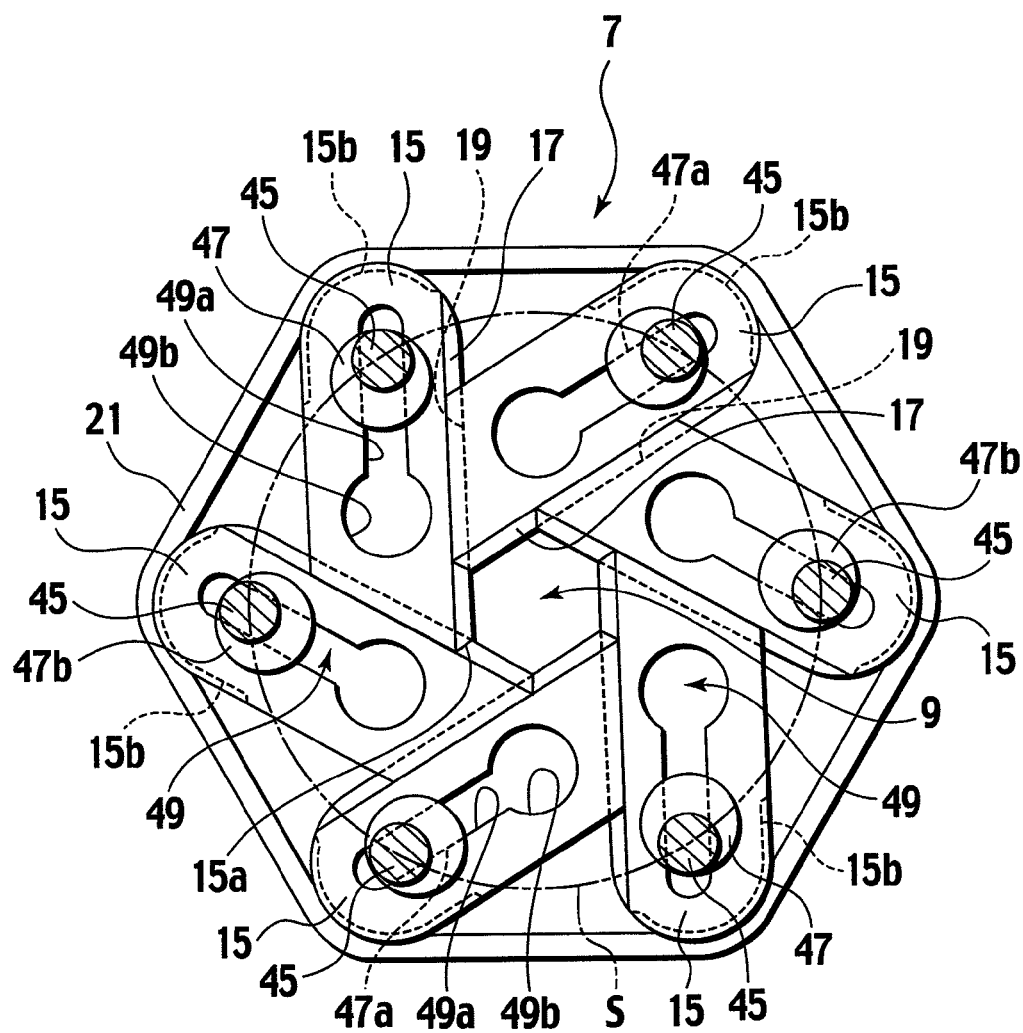
FIG. 4 is another explanatory auxiliary plan view showing how the shutter assembly operates.
Figure 5:
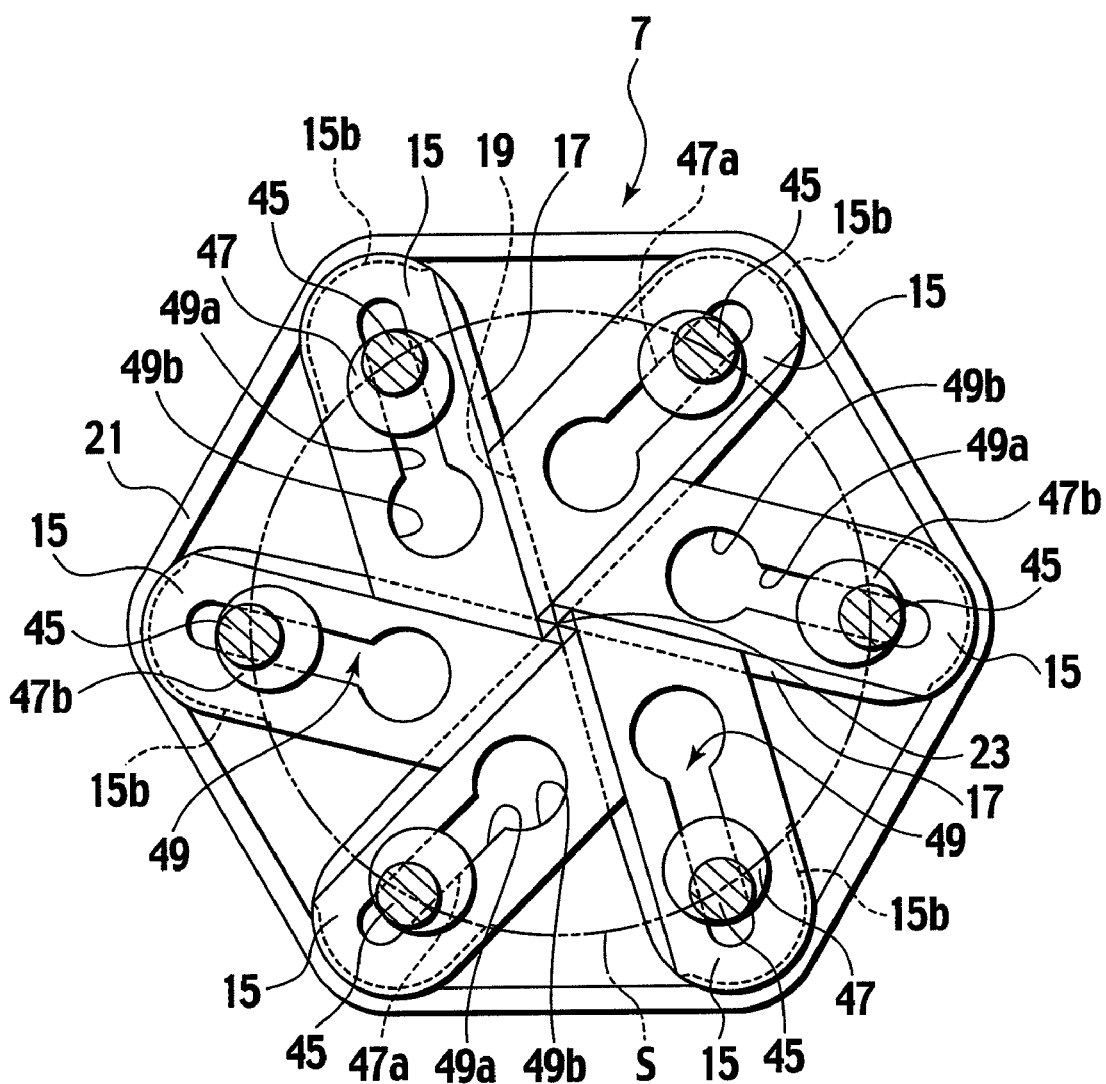
FIG. 5 is yet another explanatory auxiliary plan view showing how the shutter assembly operates.
Figure 6:
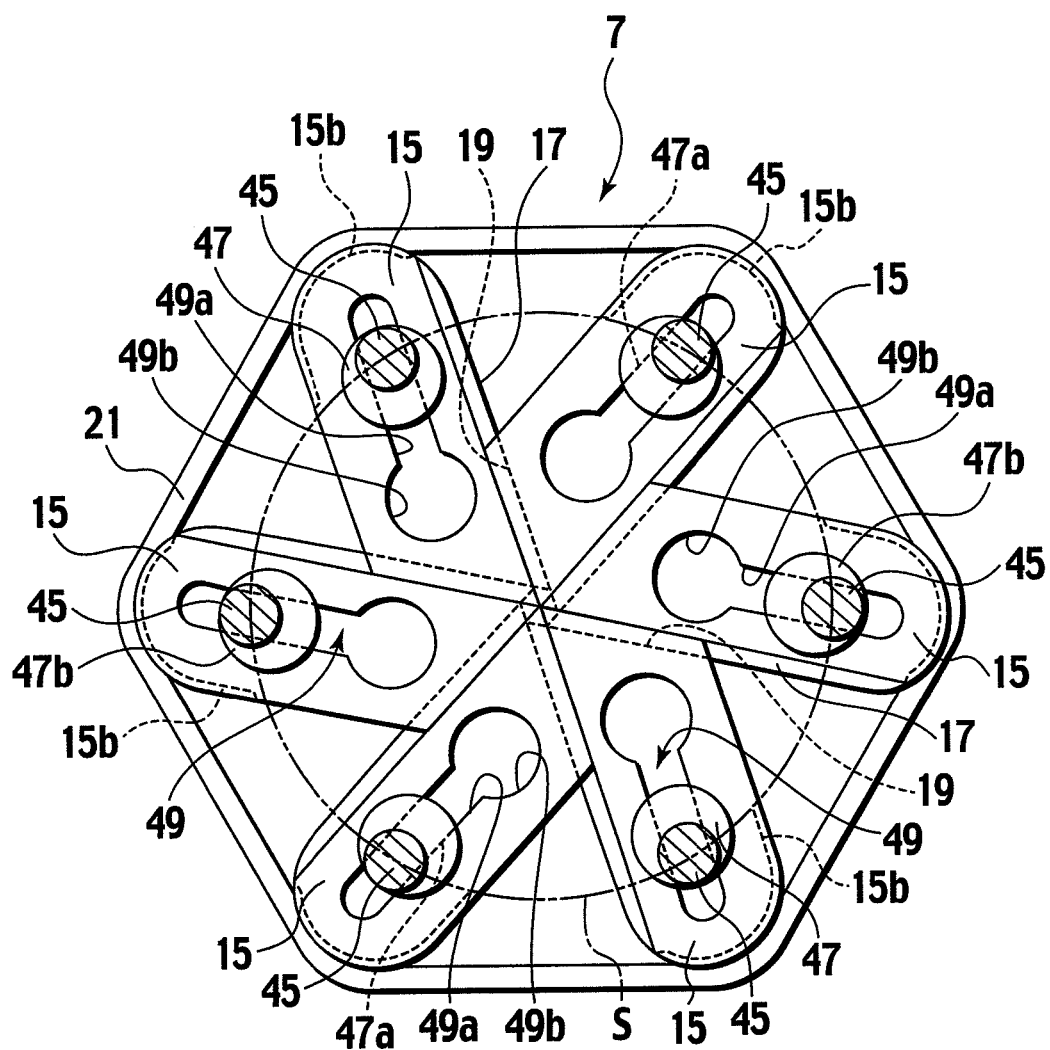
FIG. 6 is still another explanatory auxiliary plan view showing how the shutter assembly operates.

Descriptions will be hereinbelow provided chiefly for the cutting/shaping apparatus 5 as an example of the shutter apparatus. As shown in FIGS. 3 to 7, the shutter assembly 7 includes multiple assembled shutter pieces 15, or six assembled shutter pieces 15 in the present example, which are arranged in a circle as shown in FIG. 3. As shown in FIG. 7, each shutter piece 15 has a shaping surface 17 and a sliding surface 19, which are adjacent cutting surfaces. In this respect, as shown in FIG. 3, the shaping surfaces 17 respectively of the six shutter pieces 15 forms an opening part (or the center opening) 9 surrounded by the shaping surfaces 17 respectively of the shutter pieces 15 so that the opening part can dilate and contract, or open and close.

For example, each shaping surface 17 includes: a vertical part 17a; a upward slant part 17b, disposed above the vertical part 17a (or upward of the vertical part 17a in FIG. 7) for pressing the food dough W upward; and a downward slant part 17c, disposed below the vertical part 17a for pressing the food dough W downward. The intersection between the shaping surface 17 and a sliding surface 19 is used as a tip intersection part 15a. As an example of locking parts to which an elastic member 21 as a pressure contact biasing module is locked, two vertically-arranged locking grooves 15b are provided in an end of the shaping surface 17, which is different from the end where the tip intersection part 15a is located. The elastic member 21 is an example of pressure contact biasing means (module), which will be described later.

Furthermore, each shutter piece 15 has a fitting hole part 49, which is slidably fitted to a swingable member 47, in the middle of the shutter piece 15. The swingable member 47 will be described later. The fitting hole part 49 includes: an oblong hole part 49a extending in parallel to the shaping surface 17; and a circular hole part 49b existing at a side of the tip intersection part 15a of the shutter piece 15. The circular hole part 49b communicates with the oblong hole part 49a. It should be noted that it does not matter whether the oblong hole part 49a extends in parallel to the shaping surface 17. It suffices that the oblong hole part 49a be provided there so that the swingable member 47 can slide to the oblong hole part 49a.

The sliding surface 19 of each shutter piece 15 is configured to slide on the shaping surface 17 of the neighboring separate shutter piece 15. In addition, described below is an example of the pressure contact biasing means for constantly maintaining the contact between the sliding surface 19 of each shutter piece 15 and the shaping surface 17 of the neighboring shutter piece 15 under a pressure contact condition which enables the sliding surface 19 to slide on the shaping surface 17. The endless elastic member 21 such as a rubber-made O-ring is provided to the shutter pieces 15 from their outsides so that the elastic member 21 can be stretchingly wound (around) from one locking groove 15b to another in order that the elastic member 21 can get the six shutter pieces together, or in order that the sliding surface 19 of each shutter piece 15 can be biased against the shaping surface 17 of the neighboring separate shutter piece 15 by pressuring. It suffices that the elastic member 21 be shaped like an endless flat belt, and the shape of each locking groove 15b of each shutter piece 15 may be any shape corresponds to the shape of the elastic member 21.

The foregoing configuration biases the sliding surface 19 of each shutter piece 15 against the shaping surface 17 of the neighboring shutter piece 15 by pressure contact, and concurrently equally biases the shutter pieces 15 in a direction in which the opening part 9 is closed. Specifically, in FIG. 3, the shutter pieces 15 are biased in order that the shutter pieces 15 can rotate clockwise about their own rotational shafts 45. Concurrently, the shutter pieces 15 are biased in the direction in which the opening part 9 is closed, because the elastic member 21 tends to reduce their diameters due to its accumulated force.

Descriptions will be provided for a configuration which causes the six shutter pieces 15 to open and close the center opening 9 by seeing FIGS. 1 and 2. As described later, a supporting frame 27 is provided to the main body frame 3 to be movable up and down. As a shutter supporting member, an ascending/descending case 41 is detachably provided to the front end portion of the supporting frame 27 (or to the left of the supporting frame 27 in FIG. 2) by, for example, fixing the ascending/descending case 41 to the supporting frame 27 through screwing. This ascending/descending case 41 includes an entering port into which the food dough W is capable of going. Six rotatable rotational shafts 45 are provided at equal intervals on a predetermined circle S in the inside of the ascending/descending case 41.

See FIG. 7 once again. A swingable member 47 is eccentrically provided to each rotational shaft 45. The swingable member 47 is configured to support the corresponding shutter piece 15 so that the shutter piece 15 can move in directions indicated by the respective arrows a, or horizontally in the longitudinal directions of the swingable member 47 (or in directions orthogonal to the axis of the rotational shaft 45, or in the same directions as the swingable member 47 is eccentric to the rotational shaft 45), through the fitting hole part 49. In other words, the swingable member 47 includes a sliding part 47*a*, an upper restriction part 47*b* and a lower restriction part 47*c*. The sliding part 47*a* is that on which the oblong hole part 49*a* in the fitting hole part 49 slides when the shutter piece 15 swings. The horizontal cross-section of the sliding part 47*a* is an ellipse. In addition, the upper restriction part 47*b* and the lower restriction part 47*c* are those for respectively restricting upward and downward movements of the shutter piece 15 by abutting on the shutter piece 15 while the shutter piece 15 is swinging. In this respect, "upward" and "downward" means being oriented upward and downward in the axial direction of the rotational shaft 45. The diameter of the upper restriction part 47*b* is larger than that of the lower restriction part 47*c*.

Here, descriptions will be provided for how the shutter pieces 15 are attached to the respective swingable members 47. The lower restriction part 47*c* of one of the swingable members 47 is positioned to the circular hole part 49*b* of the corresponding shutter piece 15. Thereafter, the shutter piece 15 is raised to a position where the shutter piece 15 abuts on the upper restriction part 47*b* of the swingable member 47 (see FIG. 7(*a*)). Subsequently, the shutter piece 15 is horizontally moved toward the tip intersection part 15*a* of the shutter piece 15 to a position where the lower restriction part 47*c* holds the shutter piece 15 (see FIG. 7(*b*)). In this manner, the six shutter pieces 15 are slidably attached to the respective swingable members 47. After that, the endless elastic member 21 is stretchingly wound from one locking groove 15*b* to another, as the locking parts of the shutter pieces 15, from outside the shutter pieces 15 in the way that the elastic member 21 gets the six shutter pieces 15 together, or in the way that the shaping surface 17 of each shutter piece 15 slidably contacts the sliding surface 19 of the neighboring shutter piece 15 by pressure. Thereby, the shutter pieces 15 are attached to the respective swingable members 47 in the way that each shutter piece 15 abuts on the neighboring shutter piece 15. As shown in FIGS. 3 to 6, each swingable member 47 is configured to swing about the axis of the corresponding rotational shaft 45 in the horizontal direction when the rotational shaft 45 is rotated about the axis.

When the slide holding member (connecting members) is used as in the case with the conventional practice, the attaching of a shutter piece needs consideration of another shutter piece. For example, the shutter piece needs to be slit on the neighboring shutter piece to be attached. By contrast, the present embodiment makes it possible to attach each shutter piece 15 independently with no consideration paid to any other shutter piece 15. This makes it easy to attach the shutter pieces 15 to the respective swingable members 47.

See FIG. 2 once again. The cutting/shaping apparatus 5 is provided with a rotational operation apparatus 51 for synchronously rotating the six rotational shafts 45 backward and forward. In the ascending/descending case 41, driven gears 53 provided to the respective rotational shafts 45 as well as a ring-shaped intermediate gear 55 engaging with the driven gears 53 are rotatably provided. In addition, a driving gear 57 is rotatably provided with engaging with the intermediate gear 55, and the driving gear 57 is provided with a base part for a driven link 59. The driven link 59 and an output shaft 35 of a motor 31 attached to the supporting frame 27 are swingably connected with each other with a connecting link 65 and a driving link 61. With this connection scheme, the six rotational shafts 45 are rotated by rotating the output shaft 35 of the motor 31 within a required angle range (rightward and leftward). In response to the rotations of the rotational shafts 45, the shutter pieces 15 swing, respectively. As a result, the center opening 9 is opened and closed. In other words, the center opening 9 is dilated and contracted.

Descriptions will be provided next for a mechanism for causing the cutting/shaping apparatus 5 to ascend and descend. A motor 67 is provided inside the main body frame 3. The supporting frame 27 is connected to a horizontal output shaft 69 of the motor 67 with a crank mechanism 71 interposed in between. Thus, the supporting frame 27 is provided so as to ascend and descend in response to the rotational drive of the motor 67, and the cutting/shaping apparatus 5 ascends and descends in response to the upward and downward movements of the supporting frame 27. The cutting/shaping apparatus 5 ascends while the six shutter pieces 15 are opened, and the six shutter pieces 15 are being closed while the cutting/shaping apparatus 5 is descending.

The conveyer apparatus 13 includes a belt supporting member 77 for supporting a part of a belt 14. The belt supporting member 77 is ascendably and descendably provided by linking and connecting the belt supporting member 77 to the other driving shaft 73 of the motor 67 with a cam mechanism 75 interposed in between. In this respect, the elevating of the belt supporting member 77 prevents the food dough W from dropping due to its own weight while a cutting/shaping operation is being applied to the food dough W.

Descriptions will be provided for an operation of the embodiment of the present invention. While the bar-shaped food dough W is being fed to the center opening (or the opening part) 9 in the downward direction by the food dough feeding apparatus 11, a rotational drive of the output shaft 35 of the motor 31 in one direction causes the six rotational shafts 45 to synchronously rotate about their own axis forward (or counterclockwise in FIG. 3), and thus causes the six shutter pieces 15 to synchronously swing horizontally in such a direction as to close the opening part 9. At this time, each shutter piece 15 is always pressed against one of the two neighboring shutter pieces 15 (or against a neighboring shutter piece toward which the shutter piece 15 is capable of horizontally moving in the longitudinal direction of the swingable member 47) by the biasing force of the endless elastic member 21 in the way that the shutter piece 15 slides on the neighboring shutter piece 15.

Thereby, the cutting/shaping operation can be applied to the food dough W by pressing it upward with the upward slant part 17*b* of the shaping surface 17, and concurrently by pressing it downward with the downward slant part 17*c*. At this time, the vertical parts 17*a* of the shaping surfaces 17 of the six shutter pieces 15 assemble, and form a hollow 23 in the center portion on the top surface of the shutter assembly 7. With this, the center opening 9 ends its first closing operation (see FIG. 5). Subsequently, the six shutter pieces 15 are further caused to synchronously swing in such a direction so as to close the center opening 9. Thereby, the hollow 23 disappears, and the center portion on the top surface of the shutter assembly 7 becomes flat. With this, the center opening 9 ends its second closing operation (see FIG. 6).

Once the center opening 9 ends its second closing operation, a rotational drive of the output shaft 35 of the motor 31 in the other direction causes the six shutter pieces 15 to synchronously swing in such horizontal direction so as to open the center opening 9. Thereby, the center opening 9 is opened, and thus is returned to its original condition.

Multiple repetitions of the above-described operation makes it possible to apply multiple cutting/shaping operations to the bar-shaped food dough W, and accordingly to produce multiple food products WA. The multiple food products WA are conveyed to the subsequent process by the conveyer 13.

In this respect, each swingable member 47 supports, through the fitting hole part 49, the corresponding shutter piece 15 in the way that the shutter piece 15 is capable of horizontally moving in the longitudinal directions of the swingable member 47. In addition, the endless elastic member 21 is stretchingly wound around the six shutter pieces 15 constituting the shutter assembly 7 from outside of the shutter pieces 15 to get the six shutter pieces 15 together, that is, to always keep the neighboring shutter pieces 15 slidably in pressure contact with each other, thereby causing the shutter pieces 15 to equally dilate and contract the opening part 9. As a result of the tension of the elastic member 21, the biasing force works on each shutter piece 15, and the shutter pieces 15 are thus supported in the way that the sliding surface 19 of each shutter piece 15 is always capable of sliding on the shaping surface 17 of the neighboring separate shutter piece 15 in pressure contact with each other.

The above-described embodiment of the present invention enables the shaping surfaces 17 and the corresponding sliding surfaces 19 to slide on each other while keeping the shaping surfaces 17 and the sliding surfaces 19 slidably in pressure contact with each other, even in a case where the shutter pieces 15 thermally expand due to their slides or the shaping surfaces 17 and the sliding surfaces 19 abrade as a result of repetition of the cutting/shaping process for a long time. For this reason, unlike the prior art, the embodiment of the present invention makes it unnecessary to adjust the gap between each two neighboring shutter pieces 15, and accordingly makes it easier to handle the shutter pieces 15. Furthermore, the embodiment of the present invention makes it possible to prevent part of the food dough W from going into the gap between each two neighboring shutter pieces 15, and accordingly to continue a stable production for a long time.

Moreover, it suffices that the elastic member 21 be provided so as to be stretchingly wound around the shutter assembly 7 including three or more shutter pieces 15 so as to get the entire shutter assembly 7 together. For this reason, the embodiment of the present invention makes it possible to reduce the number of component members in comparison with the prior art, and concurrently makes it easier to process the shutter pieces, as well as makes it possible to simplify the configuration of the apparatus. Consequently, the embodiment of the present invention makes it possible to reduce the processing costs.

Figure 8:
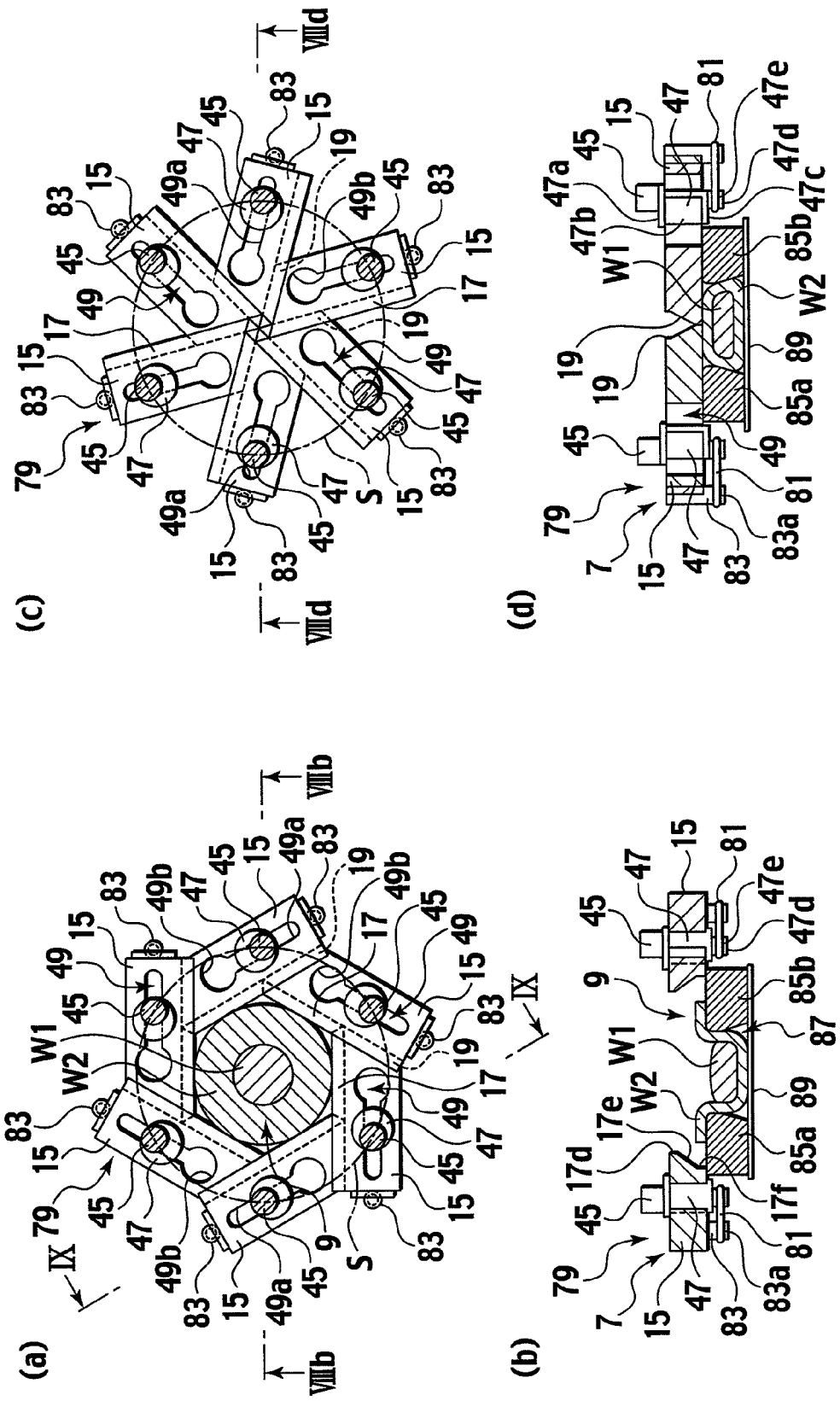
FIGS. 8(a) and 8(c) are plan views each showing a schematic and operational process of a food producing machine including a shutter apparatus according to a second embodiment of the present invention.
FIGS. 8(b) and 8(d) are explanatory auxiliary cross-sectional front views each showing the schematic and operational process of the food producing machine including the shutter apparatus according to the second embodiment, which are respectively taken along the VIIIb-VIIIb line of FIG. 8(a) and the VIIId-VIIId line of FIG. 8(c).
Figure 9:
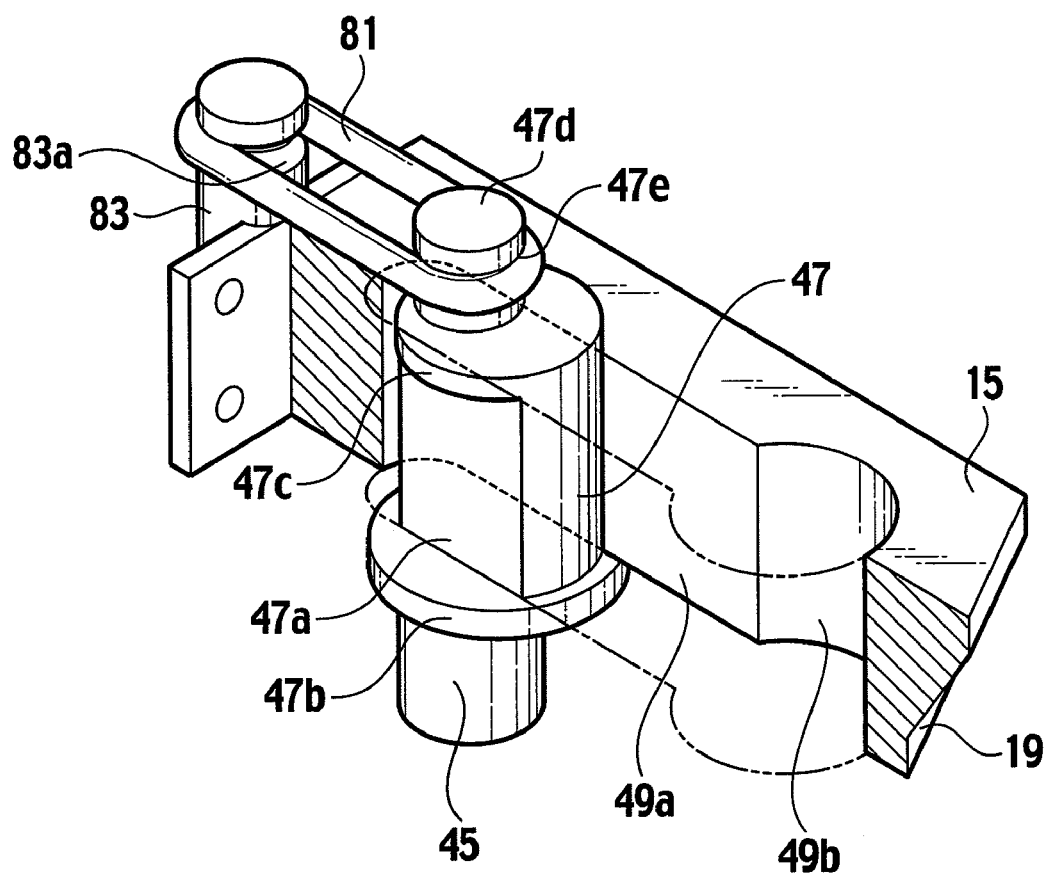
FIG. 9 is an explanatory auxiliary cross-sectional perspective view showing schematics respectively of a shutter piece, swingable member and elastic member, which is taken along the IX-IX line of FIG. 8(a).

Descriptions will be provided next for a food producing machine 79 including a shutter apparatus according to a second embodiment of the present invention by use of FIGS. 8 and 9. FIG. 8(a) is an explanatory plan view showing the schematic and operational process of the food producing machine 79. FIG. 8(b) is an explanatory auxiliary cross-sectional front view of the food producing machine 79 taken along the line VIIIb-VIIIb of FIG. 8(a). FIG. 8(c) is a plan view showing how the food producing machine 79 looks when shutter pieces perform a close operation. FIG. 8(d) is an explanatory auxiliary cross-sectional front view of the food producing machine 79 taken along the line VIIId-VIIId of FIG. 8(c). FIG. 9 is an explanatory auxiliary cross-sectional perspective view showing the schematics respectively of a shutter piece 15, a swingable member 47 and an elastic member 81 which are viewed from under, which is taken along the IX-IX line of FIG. 8. FIG. 9 shows the shutter piece 15 and the like upside down. Incidentally, components which bring about the same effects as those according to the first embodiment will be denoted by the same reference numerals, and duplicated descriptions will be omitted.

The present embodiment can be used as a shutter apparatus provided to a sealing apparatus, as shown in FIG. 26 of Patent document 4, for wrapping a filling with a sheet crust (a piece of food dough) by sealing a peripheral portion of the sheet crust. In other words, the present embodiment can be diverted to a shutter apparatus provided to a sealing apparatus including a mechanism similar to the shutter assembly 7 provided to the cutting/shaping apparatus 5. In this case, the shaping surface 17 of each shutter piece 15 which has been described with regard to the first embodiment works as an adhering surface for adhering peripheral portions of the sheet crust to each other by collecting the peripheral portions, instead of as the cutting surface.

The shaping surface 17 of the shutter piece 15 according to the second embodiment includes an upper vertical part 17d, a slant part 17e and a lower vertical part 17f, starting from the top surface. The sliding surface 19 is formed so as to slidably engage with the shaping surface 17.

In addition, an example of the contact pressure biasing means is an elastic member 81, such as the O-ring, which is put on all the shutter pieces 15 and the sliding members 47. The elastic member 81 is put thereon by being stretchingly wound around locking grooves 83a of locking parts 83 and locking grooves 47e of locking parts 47d provided to lower portions of the swingable members 47, the locking parts 83 each fixedly provided to a rear end portion of the shutter piece 15 which is located at the other side of a front end portion of the shutter piece 15 where the shaping surface 17 and the sliding surface 19 intersect each other. Specifically, each shutter piece 15 is biased in a direction in which the locking part 83 comes closer to the corresponding rotational shaft 45. In other words, each shutter piece 15 is biased so that the sliding surface 19 of the shutter piece 15 can contact the shaping surface 17 of the neighboring shutter piece 15 by pressure. As a result, because the biasing force works on the shutter piece 15 due to the tension of the elastic member 81, the sliding surface 19 of each shutter piece 15 and the shaping surface of the neighboring separate shutter piece 15 are always slidably kept in contact with each other by pressure. It should be noted that it is desirable that the elastic member 81 be an elastic member configured to have a hook or the like for locking the elastic member to the locking parts 47d and 83 in one end of the elastic member as well as an appropriately-shaped locked part in the other end thereof. The elastic member 81 may be a general coil spring or the like, for example. Furthermore, the locking part 83 of the shutter piece 15 may be cut out and formed integrally with the shutter piece 15.

The shutter apparatus is ascendably and descendably provided above paired pallets 85a and 85b as a molding box. Multiple pairs of pallets 85a and 85b are provided to an endless chain, which is not illustrated, at equal intervals, and are intermittently conveyed and positioned at a lower location of the shutter apparatus. Each paired pallets 85a and 85b include their respective semi-circular concave parts at their parts which are opposite to each other, and have a circular hole 87 in the joining part. Moreover, an endless belt 89 for supporting the crust W2 from under is provided under each paired pallets 85a and 85b, and is conveyed and driven in synchronism with the pallets 85a and 85b.

Next, descriptions will be provided for a process in which the shutter assembly 7 seals the crust W2. The crust W2 is placed on the top surfaces of the pallets 85a and 85b so as to be almost concentric with the hole 87. A concave portion is formed in the center portion of the crust W2 by an unillustrated pushing member. Subsequently, the filling W1 is fed into the concave portion by a filling material feeding apparatus (whose illustration is omitted). The crust W2 and the filling W1 thus fed are conveyed to a lower location of the shutter assembly 7, and are subsequently halted temporarily. Thereafter, the shutter assembly 7 is lowered near the pallets 85a and 85b (see FIG. 8(b)). At this time, the shaping surfaces 17 of the respective shutter pieces 15 push the peripheral portion of the crust W2 toward the center thereof, and thereby seal the crust W2 so that the filling W1 is wrapped with the crust W2 (see FIGS. 8(c) and (d)).

When, as described above, the shutter pieces 15 swing (rotate) counterclockwise in FIG. 8(a) so as to close the center opening 9, or to reduce the diameter of the center opening 9, each of sliding surfaces 19 of each shutter pieces 15 is sliding on each of shaping surfaces 17 of the each neighboring shutter pieces 15 while each of the sliding surfaces 19 of each shutter pieces 15 is kept to be pressured against (toward) each of the shaping surfaces 17 of the respective neighboring shutter pieces 15. As a result, no finest gap occurs between the sliding surface 19 of each shutter piece 15 and the shaping surface 17 of the neighboring shutter piece 15, and the above-described exiting problem can be solved.

Even in a case where the sealing process is repeated for a long time, unlike the prior art, the foregoing second embodiment makes it unnecessary to adjust the gap between each two neighboring shutter pieces, and accordingly makes it easier to handle the shutter pieces 15, as in the first embodiment. Furthermore, the embodiment of the present invention makes it possible to prevent part of the food dough W from going into the gap between each two neighboring shutter pieces 15, and accordingly to continue a stable production for a long time.

In the above-described embodiment, the shaping surface 17 of each shutter piece 15 and the sliding surface 19 of the neighboring separate shutter piece 15 are illustrated as being in full contact with each other. Actually, however, the front end portion of each shutter piece 15 where the sliding surface 19 and the shaping surface 17 intersect each other slidingly contacts the shaping surface 17 of the neighboring separate shutter piece 15. In other words, a slight room for escape is formed in the sliding surface 19 of each shutter piece 15. It should be noted that the shutter pieces 15 may be configured so that the sliding surface 19 of each shutter piece 15 and the shaping surface of the neighboring separate shutter piece are in full contact with each other. Whether the sliding surface 19 of each shutter piece 15 and the shaping surface of the neighboring separate shutter piece 15 should be in full contact or in partial contact with each other belongs to the design matter.

Figure 10:
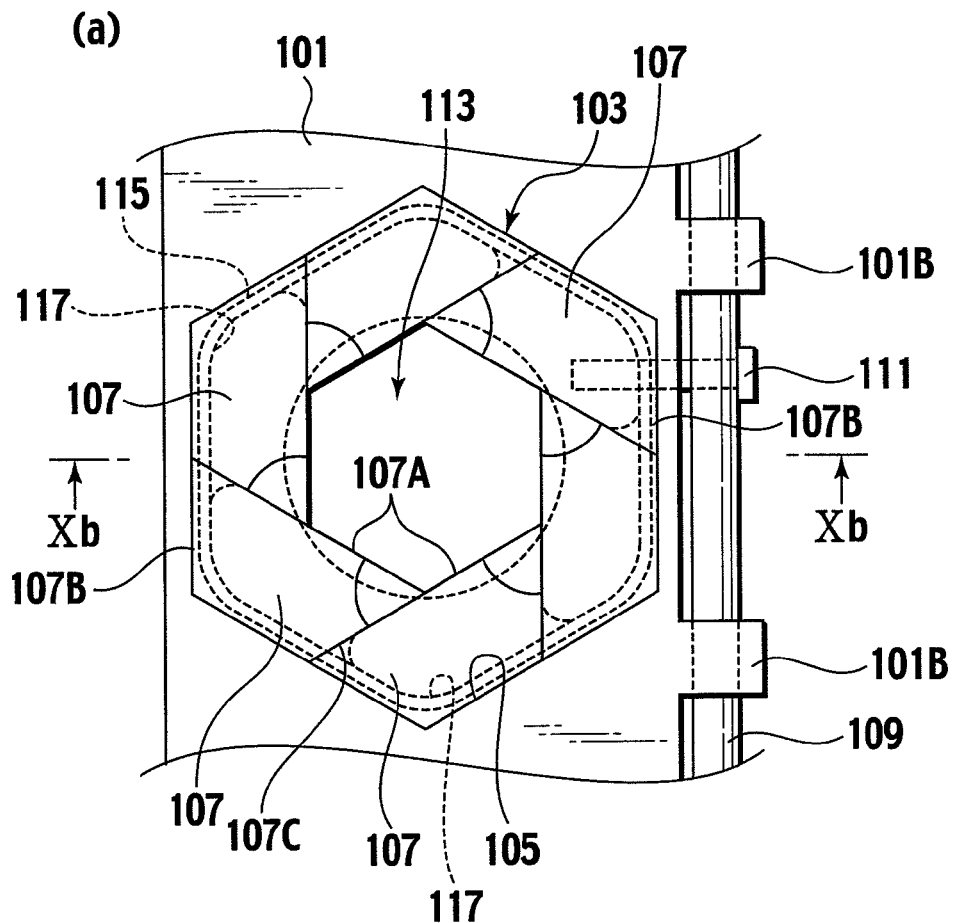
FIG. 10(a) is a plan view showing a schematic and operational process of a food producing machine including a shutter apparatus according to a third embodiment of the present invention.
FIG. 10(b) is an explanatory auxiliary cross-sectional plan view showing the schematic and operational process of the food producing machine including the shutter apparatus according to the third embodiment, which is taken along the Xb-Xb line of FIG. 10(a).
Figure 10:
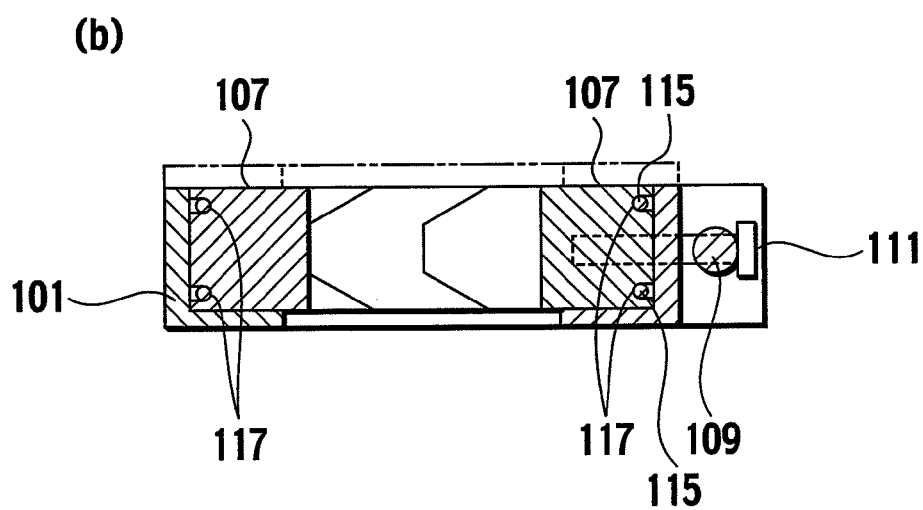
Figure 11:
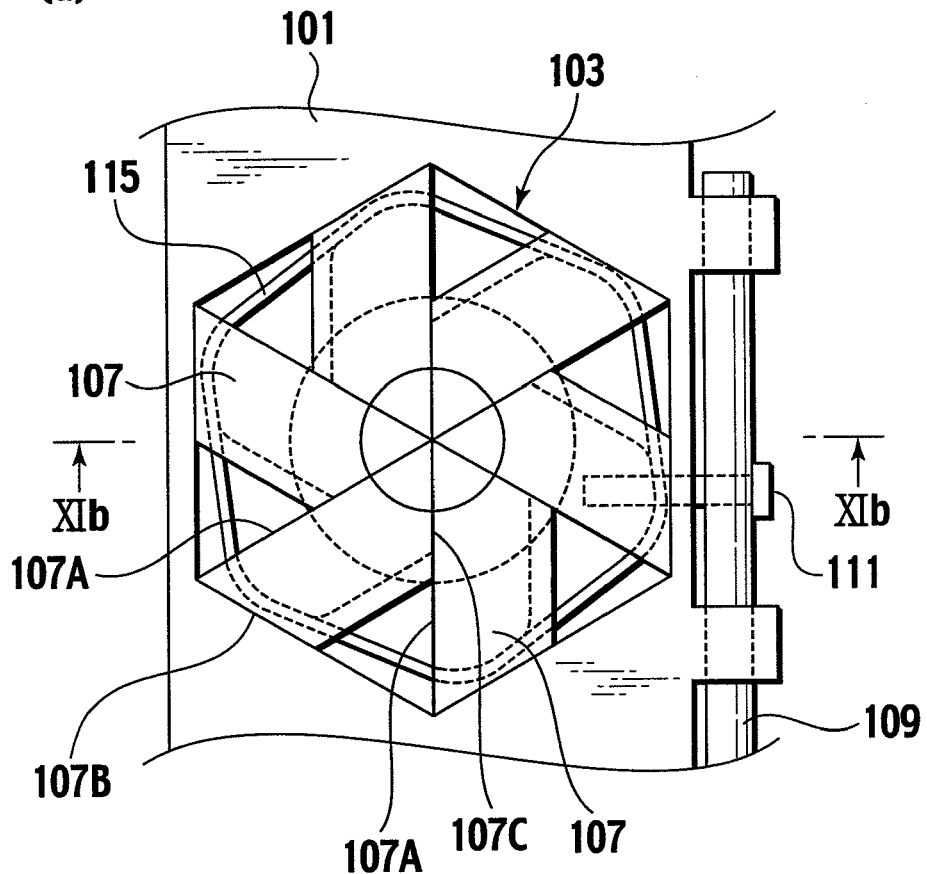
FIG. 11(a) is another plan view showing the schematic and operational process of the food producing machine including the shutter apparatus according to the third embodiment of the present invention.
FIG. 11(b) is another auxiliary cross-sectional view for explaining an action of the food producing machine including the shutter apparatus according to the third embodiment of the present invention, which is taken along the XIb-XIb line of the FIG. 11(a).
Figure 11:
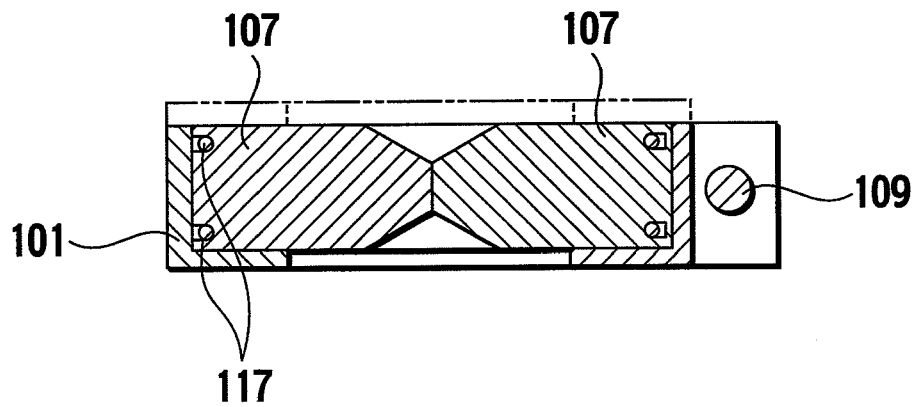

FIGS. 10(a) and (b) as well as FIGS. 11(a) and (b) show a shutter apparatus according to a third embodiment of the present invention. This shutter apparatus is a modification of a shutter apparatus described in Japanese Examined Patent Application Publication No. Hei. 4-52738.

The overall configuration of the shutter apparatus according to the third embodiment is publicly known as described in the Japanese Examined Patent Application Publication No. Hei. 4-52738. For this reason, descriptions will be provided for the schematic thereof. The shutter apparatus is configured to include a regular polygonal guide hole 103 in a frame 101. Shutter pieces 107 are provided inside this guiding hole 103 so as to respectively correspond to inner wall parts 105 constituting the polygon into which the guiding hole 103 is formed. The shutter pieces 107 are capable of sliding along the corresponding inner wall parts 105. Each shutter piece 107 is shaped like a trapezoid and its external shape is similar to that of each shutter piece shown in Japanese Examined Patent Application Publication No. Hei. 4-52738. Specifically, each shutter piece 107 includes: an shaping surface 107A; a first sliding surface 107B slidably contacting the corresponding inner wall part 105 of the guide hole 103; and a second sliding surface 107C slidably contacting the shaping surface 107A of the neighboring separate shutter piece 107.

A movement member (or a movement rod) 109 capable of moving in a direction in parallel to a direction in which an appropriate inner wall part 105 of the guide hole 103 extends is supported reciprocativelly by the frame 101 through a bracket 101B. This movement member 109 and a shutter piece whose first sliding surface 107B slidably contacts the appropriate inner wall part 105 are integrally connected to each other by use of a connecting member 111 such as a rod.

The foregoing configuration causes the reciprocating movement of the movement member 109 in the longitudinal direction to contract and dilate an opening 113 surrounded by the shaping surfaces 107A of the respective shutter pieces 107.

The foregoing configuration includes pressure contact biasing means for always keeping the shaping surface 107A of each shutter piece 107 and the second sliding contact surface 107C of the neighboring shutter piece 107 slidably in pressure contact with each other. Specifically, a locking groove as a locking part 117 to which an endless elastic member 115 as an example of the pressure contact biasing means is locked (or around which the endless elastic member 115 is stretchingly wound) is formed in an end of each shutter piece 107. The end portion is separate away from the other end of the shutter piece 107 on which end the shaping surface 107A of the shutter piece 107 and the second sliding contact surface 107C of the neighboring shutter piece 107 intersect each other.

For this reason, the biasing force of the endless elastic member 115 as the pressure contact biasing means in the diameter reducing (or the contracting) direction always keeps the shaping surface 107A of each shutter piece 107 and the second sliding contact surface 107C of the neighboring separate shutter piece 107 slidably in pressure contact with each other. As a result, no fine gap occurs between the sliding surface 107A of each shutter piece 107 and the shaping surface 107C of the neighboring shutter piece 107, and the above-described exiting problems can be solved.

It goes without saying that the shutter apparatus with the foregoing configuration can be used as the shutter mechanism for the cutting/shaping apparatus. The shutter apparatus can be also used with the opening 113 being dilated and contracted without closing the opening 113 completely. In this case, the shutter apparatus is used for gathering, for example, multiple ball-shaped, cylindrical, or columnar food products, food dough or the like, which are placed in the opening 113, to the center portion of the opening 113. For this reason, the shutter apparatus is useful for packing multiple food products or the like, as an aggregate, in a box.

FIGS. 12(a) and (b) as well as FIGS. 13(a) and (b) show a shutter apparatus according to a fourth embodiment of the present invention. This shutter apparatus is a modification of a shutter apparatus described in Japanese Patent No. 2729898. Because the overall configuration of the shutter apparatus is publicly known by the patent, descriptions will be provided for the schematic of the shutter apparatus.

The shutter apparatus includes multiple rotatable rotational shafts 151 which are arranged at equal intervals on a single circle. A guide part 153 in which mutually parallel guide surfaces are formed is formed in each rotational shaft 151. The guide surfaces are formed by cutting away the respective parts of the rotational shaft 151 which are opposite to each other. A shutter piece 155 is attached to each guide part 153 so as to be rotatable is together with the rotational shaft 151, and to be slightly movable in a direction orthogonal to the axis of the rotational shaft 151.

More specifically, each shutter piece 155 is configured to include a shaping surface 155F around all of its sides. The external shape of each shutter piece 155 is similar to that of each shutter piece described in Japanese Patent No. 2729898, and is thus publicly known. For this reason, detailed descriptions for the external shape will be omitted. An oblong hole 159 which is fitted to the guide part 153 of the rotational shaft 151 is formed in a hub 157 of the shutter piece 155 supported by each rotational shaft 151. This oblong hole 159 is that which is oblong in a longitudinal direction in which a line joins the center of the shutter piece 155 and a front end part 161 of the same shutter piece 155. For this reason, the oblong hole 159 is allowed to slightly move in the longitudinal direction relative to the rotational shaft 151.

The front end part 161 of the shutter piece 155 supported by each rotational shaft 151 slidably contacts the shaping surface 155F of the neighboring shutter piece. An opening 163 surrounded by the shaping surfaces 155F of the respective shutter pieces 155 is dilated and contracted by rotating the rotational shaft 151 forward and backward. In addition, the front end part 161 of each shutter piece 155 and the shaping surface 155F of the neighboring shutter piece 155 are always kept slidably in pressure contact with each other.

Figure 12:
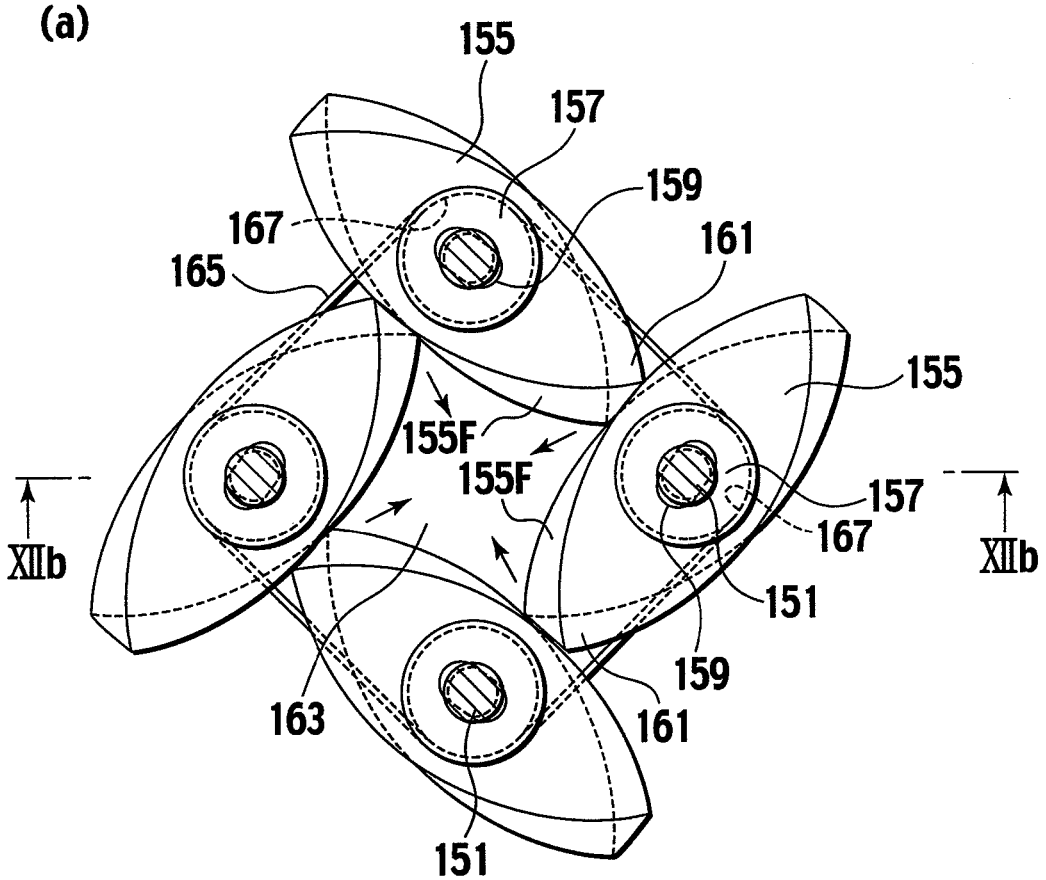
FIG. 12(a) is a plan view showing a schematic and operational process of a food producing machine including a shutter apparatus according to a fourth embodiment of the present invention.
FIG. 12(b) is an explanatory auxiliary cross-sectional plan view showing the schematic and operational process of the food producing machine including the shutter apparatus according to the fourth embodiment, which is taken along the XIIb-XIIb line of FIG. 12(a).
Figure 12:
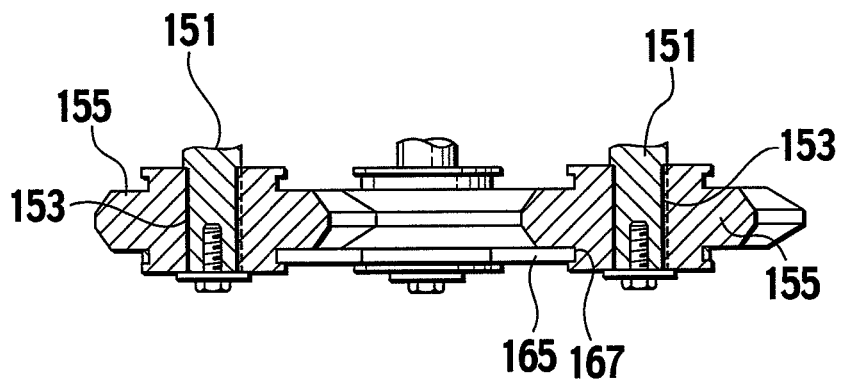

Because the shaping surface 155F of each shutter piece 155 is formed throughout the periphery of the shutter piece 155, the shutter piece 155 can be used by rotating the rotational shaft 151 only clockwise in FIG. 12. In a case where, however, the shaping surface 155F of each shutter piece 155 is not formed throughout the periphery of the shutter piece 155, the shutter piece 155 is used by rotating the rotational shaft 151 forward and backward. It should be noted that each shutter piece may be used by rotating the rotational shaft 151 forward and backward even when being configured to be used by undirectionally rotating the rotational shaft 151.

Specifically, groove-shaped locking parts 167 around which an endless elastic member 165 as an example of the pressure contact biasing means is stretchingly wound are formed in the hubs 157 of the shutter pieces 155, respectively. As a result, the biasing force of the elastic member 165 causes the front end portion of each shutter piece 155 to abut on the shaping surface 155F of the neighboring shutter piece 155 by pressure, and thus keeps the front end portion in pressure contact with the shaping surface 155F. Accordingly, the front end portion and the shaping surface 155F slide on each other while the front end portion is kept in pressure contact with the shaping surface 155F.

Figure 13:
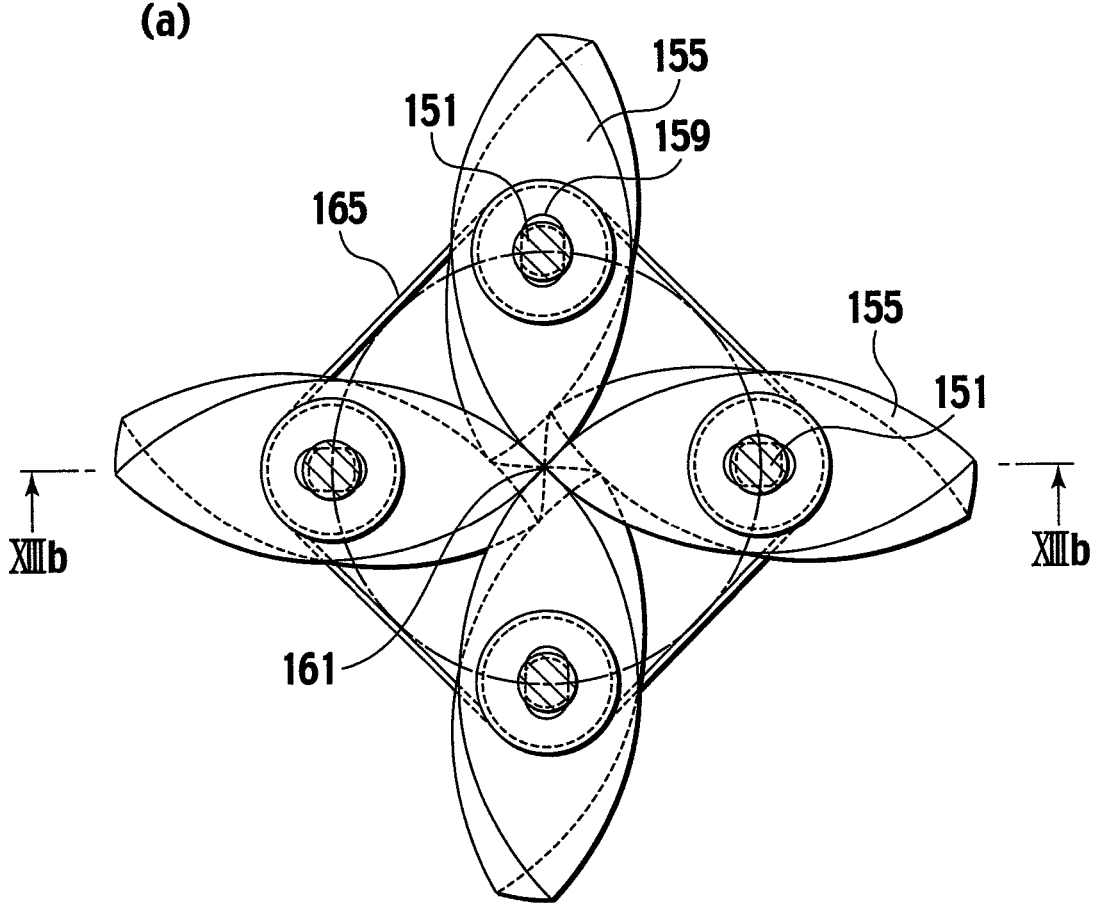
FIG. 13(a) is another plan view showing the schematic and operational process of the food producing machine including the shutter apparatus according to the fourth embodiment of the present invention.
FIG. 13(b) is another auxiliary cross-sectional view for explaining an action of the food producing machine including the shutter apparatus according to the fourth embodiment of the present invention, which is taken along the XIIIb-XIIIb line of the FIG. 13(a).
Figure 13:
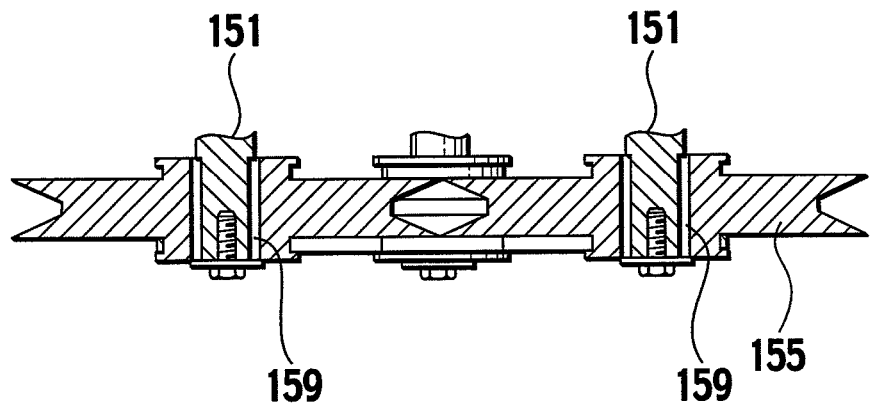

For this reason, the foregoing configuration causes no fine gap in the contact part between the front end portion of each shutter piece 155 and the shaping surface 155F of the neighboring shutter piece 155. Furthermore, even in a case where, as shown in FIG. 13, the front end portions 161 of the respective shutter pieces 155 gather in the center portion of the opening, no fine gap occurs among the front end portions 161 of the respective shutter pieces 155, and the above-described exiting problems can be solved.

The present invention should not be limited to the foregoing embodiments of the present invention and is capable of being carried out as the following variety of applications.

In the first embodiment, the locking grooves 15b to which the elastic member 21 is locked is provided to an end of each shutter piece 15, and the elastic member 21 is put on the six shutter pieces 15 to get the six shutter pieces 15 together by stretchingly winding the elastic member 21 around the shutter pieces 15 from outside. It suffices, however, that the biasing force work on the shutter pieces 15 due to the tension of the elastic member 21 so that each shutter piece 15 slides on the neighboring shutter piece 15. For this reason, the elastic member may be put on the shutter pieces by stretchingly winding the elastic member around locking parts, such as pins, which be instead installed upright in a bottom surface of each shutter piece 15. Otherwise, the elastic member 21 may be put on the shutter pieces 15 by stretchingly winding the elastic member 21 around the locking parts 83, which have described with regard to the second embodiment. Thereby, each shutter piece 15 and the neighboring shutter piece 15 are always capable of being kept in the slidable condition.

Figure 14:
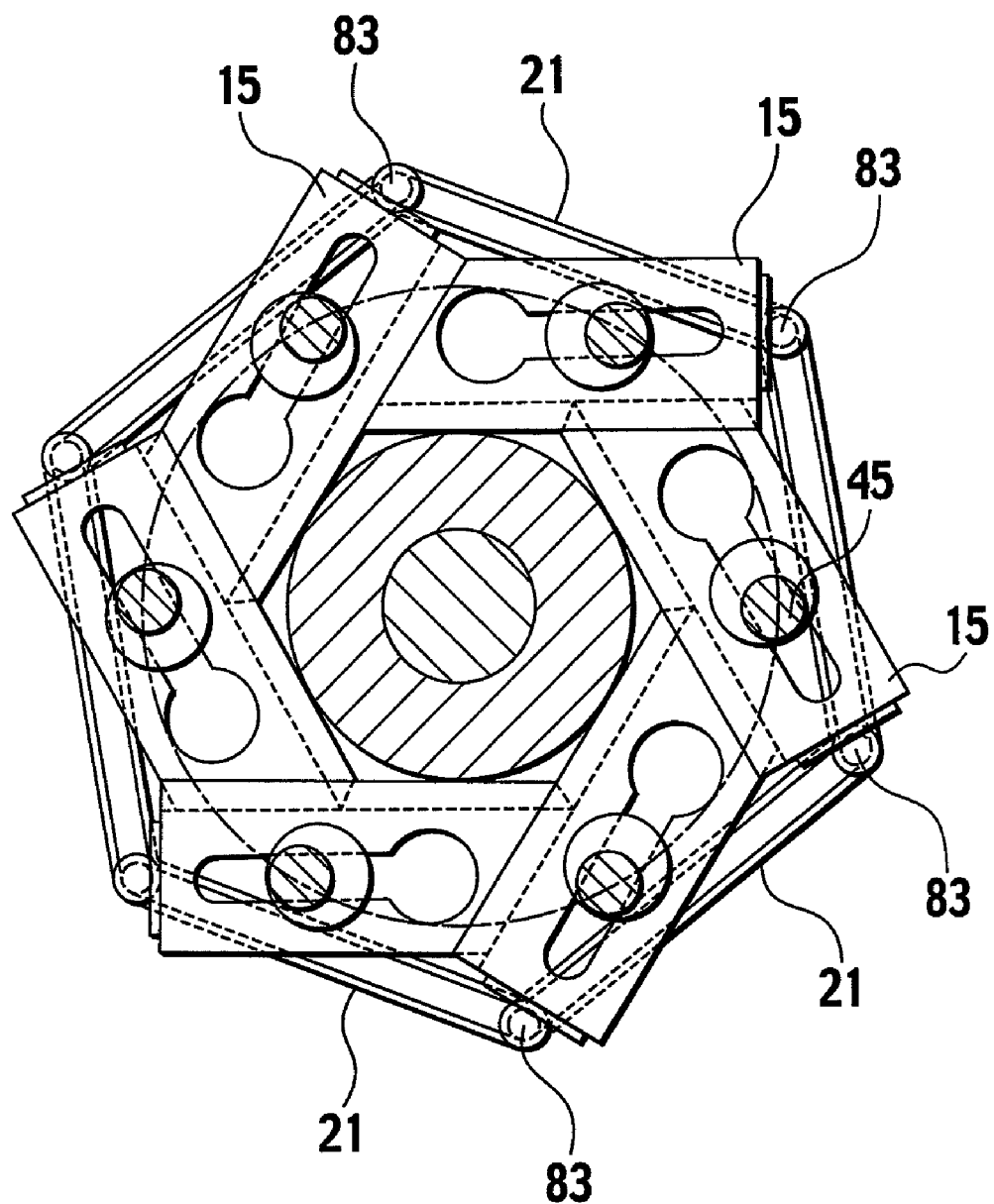
FIG. 14 is an explanatory view of another embodiment in which an elastic member is laid across in a tensioned condition.

Furthermore, as shown in FIG. 14, the elastic member 21 may be put on each two neighboring locking parts 83 so as to be stretchingly wound (around) between the two neighboring locking parts 83. It should be noted that this configuration is applicable to each of the first, third and fourth embodiments. In other words, a configuration may be used, wherein a hook, such as a pin, which serves as a locking part is provided to an end portion of each shutter piece so that the elastic member is stretchingly wound between each two neighboring shutter hooks.

Although, in the foregoing embodiments, having been described as being the endless members, the elastic members 21, 81, 115 and 165 do not have to be endless. For example, a string-shaped elastic member may be used. In this case, a connecting part (for example, a protruding part) is provided to an end portion of the elastic member whereas a connected part (for example, a hole) is provided to the other end portion of the elastic member so that the connected part thereof corresponds to the connecting portion thereof. Subsequently, the elastic member is put on the shutter pieces to get the shutter piece together by stretching the elastic member around the shutter pieces, and finally by connecting the connecting part and the connected part (or the protruding part and the hole) to each other. Such configuration also causes a biasing force to take place in the elastic member, and thus makes it possible to cause the biasing force of the elastic member to work on the shutter pieces in a way that each two neighboring shutter pieces slide on each other. Furthermore, if multiple holes are provided to the former end portion of the string-shaped elastic member, it is possible to adjust the biasing force working on the shutter pieces by changing a hole which is connected to the protruding part for another.

Additionally, in the foregoing embodiments, each of the elastic members 21 and 81 has been described as being all configured of an elastic material. However, another configuration may be used, wherein a part of the elastic member includes an elastic material whereas the rest of the elastic member is configured of, for example, a string or the like which is made of fibers. It suffices that the elastic member be provided in the way that each shutter piece can slide on the neighboring shutter piece due to the biasing force from the means for biasing each two neighboring shutter pieces to each other when the shutter assembly 7 opens and closes the center opening 9.

Moreover, in the foregoing embodiments, the rotational shaft 45 and the swingable member 47 have been described as being the integrated members. However, it suffices that the swingable member 47 swing about the axis of the rotational shaft 45. For this reason, the rotational shaft 45 and the swingable member 47 may be separately provided and connected to each other with a screw member or the like through the engagement parts (for example, concave and convex engagement mechanisms) respectively provided thereto.

In addition, each shaping surface and each sliding surface 19 of each shutter piece 15 may be formed into various shapes depending on an expected purpose, for example, the shapes shown in Patent Document 2 or 4.

Furthermore, the bar-shaped food product W continuously fed has been described as being pushed out of the food dough feeding apparatus 11. Instead, for example, a bar-shaped food product W, into which a belt-shaped food dough (for example, bread dough) transferred by the transfer conveyer is formed by rolling up the end portions thereof, may be fed to the center opening 9 of the shutter assembly 7 so as to drop down from a downstream end portion of the transfer conveyer. In addition, the bar-shaped food product W may be cut into cut food products while being fed to the center opening 9 of the shutter assembly 7. The shutter assembly 7 is provided between two transfer conveyers consisting of the original transfer conveyer and the other transfer conveyer newly provided downstream of the original transfer conveyer in a way that the center opening 9 is opened and closed in the vertical direction, that is, by providing the shutter assembly 7 to a shutter supporting member in which the rotational shafts 45 are arranged in the horizontal direction.

The invention claimed is:

1. A shape-forming shutter apparatus, comprising:
 a plurality of shutter pieces, each of the shutter pieces having a shaping surface and a sliding surface, the plurality of shutter pieces being arranged in a circle in a manner such that the shaping surface of each shutter piece is slidably in sliding contact with the sliding surface of the neighboring separate shutter pieces; and
 an opening part being surrounded by the shaping surfaces of the plurality of shutter pieces, the opening part being capable of dilating and contracting,
 characterized in that, the shape-forming shutter apparatus comprises a pressure contact biasing module always to keep the shaping surface of each shutter piece and the sliding surface of the neighboring shutter piece slidably in pressure contact with each other, and
 characterized in that, the pressure contact biasing module is a ring-shaped elastic member for biasing the shutter pieces equally, and the pressure contact biasing module is stretchingly wound around the shutter pieces.

2. A shape-forming shutter apparatus, comprising:
 a plurality of rotational shafts rotatably provided at equal intervals in a single circle;
 a plurality of shutter pieces, each of the shutter pieces having a shaping surface on its lateral surface, each of the shutter pieces being integrally rotatably attached to each of the plurality of rotational shafts, wherein a front end portion of each shutter piece is slidably in contact with the shaping surface of the neighboring shutter piece; and
 an opening part being surrounded by the shaping surfaces of the respective shutter pieces, the opening part being capable of dilating and contracting,
 characterized in that, each of the shutter pieces is able to move in a direction in which the front end portion of each shutter piece is pressed to the shaping surface of the neighboring separate shutter piece; and
 characterized in that the shape-forming shutter apparatus comprises a pressure contact biasing module to bias the front end portion of each shutter piece into pressure contact with the shaping surface of the neighboring separate shutter piece, thereby the front end portion of each shutter piece and the shaping surface of the neighboring shutter piece can be kept slidably in pressure contact with each other, and
 characterized in that, the pressure contact biasing module is a ring-shaped elastic member for biasing the shutter pieces equally, and the pressure contact biasing module is stretchingly wound around the shutter pieces.

3. A shape-forming shutter apparatus, comprising:
 a plurality of shutter pieces, each of the shutter pieces having a shaping surface and a sliding surface, the plurality of shutter pieces being arranged in a circle in a manner such that the shaping surface of each shutter piece is slidably in sliding contact with the sliding surface of the neighboring separate shutter pieces; and
 an opening part being surrounded by the shaping surfaces of the plurality of shutter pieces, the opening part being capable of dilating and contracting,
 characterized in that, the shape-forming shutter apparatus comprises a pressure contact biasing module always to keep the shaping surface of each shutter piece and the sliding surface of the neighboring shutter piece slidably in pressure contact with each other, and
 characterized in that the pressure contact biasing module is stretchingly wound around the shutter pieces at their ends each being separate away from the other end thereof where the shaping surface of the shutter piece and the sliding surface of the neighboring shutter piece intersect each other.

4. A shape-forming shutter apparatus, comprising:
 a plurality of shutter pieces, each of the shutter pieces having a shaping surface and a sliding surface, the plurality of shutter pieces being arranged in a circle in a manner such that the shaping surface of each shutter piece is slidably in sliding contact with the sliding surface of the neighboring separate shutter pieces; and
 an opening part being surrounded by the shaping surfaces of the plurality of shutter pieces, the opening part being capable of dilating and contracting,
 characterized in that, the shape-forming shutter apparatus comprises a pressure contact biasing module always to keep the shaping surface of each shutter piece and the sliding surface of the neighboring shutter piece slidably in pressure contact with each other, and
 characterized in that the pressure contact biasing module is installed by stretchingly winding the pressure contact biasing module around locking parts each provided in an end of the corresponding shutter piece, which end is separate away from the other end thereof where the shaping surface of the shutter piece and the sliding surface of the neighboring shutter piece intersect each other.

5. A shape-forming shutter apparatus, comprising:
 a plurality of shutter pieces, each of the shutter pieces having a shaping surface and a sliding surface, the plurality of shutter pieces being arranged in a circle in a manner such that the shaping surface of each shutter piece is slidably in sliding contact with the sliding surface of the neighboring separate shutter pieces; and
 an opening part being surrounded by the shaping surfaces of the plurality of shutter pieces, the opening part being capable of dilating and contracting, characterized in that, the shape-forming shutter apparatus comprises a pressure contact biasing module always to keep the shaping surface of each shutter piece and the sliding surface of the neighboring shutter piece slidably in pressure contact with each other, and characterized in that each shutter piece is supported by a corresponding one of rotational shafts arranged at equal intervals on a single circle to be rotatable integrally with the rotational shaft, and to be movable in a direction orthogonal to an axis of the rotational shaft; and that the pressure contact biasing module is arranged between each rotational shaft and a locking part provided to the corresponding shutter piece.

6. A shutter piece, comprising a shaping surface and a sliding surface, the shutter piece being used in a shutter apparatus which includes a plurality of the shutter pieces arranged in a circle with the shaping surface of each of the shutter pieces being slidably in sliding contact with the sliding surface of the neighboring separate shutter piece, the shutter apparatus having an opening part surrounded by the shaping surfaces respectively of the plurality of shutter pieces, the opening part being capable of dilating and contracting, characterized in that the shutter piece comprises locking parts which are stretchingly wound with a pressure contact biasing module around the locking parts, the pressure contact biasing module being for keeping the shaping surface of each shutter piece and the sliding surface of the neighboring shutter piece slidably in pressure contact with each other; and characterized in that each of the locking parts is provided in an end of the corresponding shutter piece, which end is separate away from the other end thereof where the shaping surface of the shutter piece and the sliding surface of the neighboring shutter piece intersect each other.

7. The shutter piece according to claim 6, characterized in that the shutter piece comprises an oblong hole part slidably engaging only with a sliding part provided to a rotational shaft for supporting the shutter piece.

8. A shutter piece comprising a shaping surface throughout its side, the shutter piece being used in a shutter apparatus in which the shutter pieces are integrally rotatably attached respectively to a plurality of rotational shafts rotatably provided at equal intervals in a single circle in a manner such that a front end portion of each shutter piece is slidably in sliding contact with the shaping surface of the neighboring shutter piece, and the shutter apparatus having an opening part surrounded by the shaping surfaces of the respective shutter pieces and the opening part being capable of dilating and contracting;

characterized in that the shutter piece comprises:

an oblong hole allowing each shutter piece to move in a direction orthogonal to an axis of the corresponding rotational shaft, the oblong hole provided in an engagement part of the shutter piece, which part engages with the rotational shaft; and a locking part which is stretchingly wound with a pressure contact biasing module in a manner such that the pressure contact biasing module stretchingly winds the locking parts and the rotational shaft, the pressure contact biasing module being to press and bias the front end portion of each shutter piece toward the shaping surface of the neighboring shutter piece, thereby the front end portion comes into contact with the shaping surface of the neighboring shutter piece by pressure.

9. A shutter piece comprising a shaping surface and a sliding surface, the shutter piece being used in a shutter apparatus which includes a plurality of shutter pieces arranged in a circle with the shaping surface of each of the shutter pieces being slidably in sliding contact with the sliding surface of the neighboring shutter piece, the shutter apparatus having an opening part surrounded by the shaping surfaces respectively of the shutter pieces, the opening part being capable of dilating and contracting, characterized in that the shutter piece comprises locking grooves which are stretchingly wound with an endless elastic member around the locking grooves of the shutter pieces, the endless elastic member being for keeping the shaping surface of each shutter piece and the sliding surface of the neighboring shutter piece slidably in pressure contact with each other; and characterized in that each of the locking grooves is provided in an end of the corresponding shutter piece, which end is separate away from the other end thereof where the shaping surface of the shutter piece and the sliding surface of the neighboring shutter piece intersect each other.

* * * * *

UNITED STATES PATENT AND TRADEMARK OFFICE
CERTIFICATE OF CORRECTION

| | | |
|---|---|---|
| PATENT NO. | : 7,901,198 B2 | Page 1 of 1 |
| APPLICATION NO. | : 12/097812 | |
| DATED | : March 8, 2011 | |
| INVENTOR(S) | : K. Onoguchi | |

It is certified that error appears in the above-identified patent and that said Letters Patent is hereby corrected as shown below:

On the cover page under References Cited (56) – OTHER PUBLICATIONS change "English language Abstract of JP 10-084877, Apr. 7, 2008." to -- English language Abstract of JP 10-084877, Apr. 7, 1998. --.

Signed and Sealed this
Fourth Day of October, 2011

David J. Kappos
*Director of the United States Patent and Trademark Office*